(12) United States Patent
Shrivastav et al.

(10) Patent No.: US 12,521,045 B2
(45) Date of Patent: Jan. 13, 2026

(54) CARDIAC AND TEMPERATURE MONITOR

(71) Applicant: Medtronic, Inc., Minneapolis, MN (US)

(72) Inventors: Maneesh Shrivastav, Blaine, MN (US); Shailesh Kumar V. Musley, Brooklyn Park, MN (US); Vinod Sharma, Maple Grove, MN (US)

(73) Assignee: Medtronic, Inc., Minneapolis, MN (US)

( * ) Notice: Subject to any disclaimer, the term of this patent is extended or adjusted under 35 U.S.C. 154(b) by 474 days.

(21) Appl. No.: 17/821,964

(22) Filed: Aug. 24, 2022

(65) Prior Publication Data

US 2023/0067931 A1 Mar. 2, 2023

Related U.S. Application Data

(60) Provisional application No. 63/239,932, filed on Sep. 1, 2021.

(51) Int. Cl.
*A61B 5/145* (2006.01)
*A61B 5/00* (2006.01)
(Continued)

(52) U.S. Cl.
CPC ........ *A61B 5/14532* (2013.01); *A61B 5/0006* (2013.01); *A61B 5/0008* (2013.01); *A61B 5/02055* (2013.01); *A61B 5/28* (2021.01); *A61B 5/352* (2021.01); *A61B 5/355* (2021.01); *A61B 5/746* (2013.01); *A61B 2562/0271* (2013.01)

(58) Field of Classification Search
CPC .......... A61B 5/14532; A61B 5/02055
See application file for complete search history.

(56) References Cited

U.S. PATENT DOCUMENTS 6,572,542 B1    6/2003  Houben et al.
7,052,472 B1    5/2006  Miller et al.
(Continued)

FOREIGN PATENT DOCUMENTS

WO    2021038229 A1    3/2021

OTHER PUBLICATIONS

International Search Report and Written Opinion of International Application No. PCT/US2022/041563 dated Dec. 5, 2022, 16 pp.
(Continued)

*Primary Examiner* — Tammie K Marlen
(74) *Attorney, Agent, or Firm* — Shumaker & Sieffert, P.A.

(57) ABSTRACT

A medical system including processing circuitry configured to assess a blood glucose level of a patient. The processing circuitry is configured to use a cardiac signal indicative of the electrical activity of the patient's heart and a temperature signal indicative of a body temperature of the patient. The cardiac signal may be, for example, an electrocardiogram (ECG), an electrogram (EGM), or another measure. The medical system is configured to determine a representative cardiac measure indicative of the cardiac signal and determine a representative temperature measure indicative of the temperature signal. The medical system is configured to assess when a blood glucose level of the patient may be outside a euglycemic range based on the representative cardiac measure and the representative temperature measure determined.

19 Claims, 6 Drawing Sheets

(51) Int. Cl.
*A61B 5/0205* (2006.01)
*A61B 5/28* (2021.01)
*A61B 5/352* (2021.01)
*A61B 5/355* (2021.01)

(56) References Cited

U.S. PATENT DOCUMENTS

| | | | |
|---|---|---|---|
| 7,103,412 | B1 | 9/2006 | Kroll |
| 7,756,572 | B1 | 7/2010 | Fard et al. |
| 9,282,895 | B2 | 3/2016 | Wenzel et al. |
| 2010/0030092 | A1 | 2/2010 | Kristensen et al. |
| 2010/0280348 | A1 | 11/2010 | Wenzel et al. |
| 2019/0382025 | A1 | 12/2019 | Mena Benito et al. |
| 2020/0129099 | A1 | 4/2020 | Mi et al. |
| 2020/0155003 | A1 | 5/2020 | Mitchell et al. |
| 2022/0346676 | A1* | 11/2022 | Pecchia .......... A61B 5/318 |

OTHER PUBLICATIONS

Amanipour et al., "The effects of blood glucose changes on frequency-domain measures of HRV signal in type 1 diabetes", 22nd International Conference on Electrical Communications and Computers, Feb. 27, 2012, pp. 50-54.

Attia et al., "Novel bloodless potassium determination using a signal-processed single-lead ECG", Journal of the American Heart Association, vol. 5, No. 1, Jan. 25, 2016, 9 pp.

Ballinger et al., "DeepHeart: semi-supervised sequence learning for cardiovascular risk prediction", Thirty-Second AAAI Conference on Artificial Intelligence, Apr. 26, 2018, 9 pp.

Berntson et al., "Heart rate variability: origins, methods, and interpretive caveats", Psychophysiology, vol. 34, No. 6, Nov. 1997, pp. 623-648.

Bigger et al., "Frequency domain measures of heart period variability and mortality after myocardial infarction", Circulation, vol. 85, No. 1, Jan. 1992, pp. 164-171.

Dillon et al., "Noninvasive potassium determination using a mathematically processed ECG: Proof of concept for a novel blood-less, blood test", Journal of electrocardiology, vol. 48, No. 1, Jan. 1, 2015, pp. 12-18.

Forester et al., "Variability of RR, P wave-to-R wave, and R wave-to-T wave intervals", American Journal of Physiology—Heart and Circulatory Physiology, vol. 273, No. 6, Dec. 1, 1997, pp. H2857-H2860.

Fruehwald-Schultes et al., "Preserved hypothermic response to hypoglycemia after antecedent hypoglycemia", Metabolism, vol. 49, No. 6, Jun. 2000, pp. 794-798.

Heinemann et al., "Hypoglycemia detection by ECG recording", Diabetes care, vol. 18, No. 1, Jan. 1, 1995, pp. 139-140.

Hoppe et al., "Association of abnormal serum potassium levels with arrhythmias and cardiovascular mortality: a systematic review and meta-analysis of observational studies", Cardiovascular drugs and therapy, vol. 32, No. 2, Apr. 2018, pp. 197-212.

Houben, "The Relationship Between Glucose Metabolic Processes and the ECG", Medtronic Science & Technology Journal, vol. 5, No. 1, 1997, 44 pp., (Applicant points out, in accordance with MPEP 609.04(a), that the year of publication, 1997, is sufficiently earlier than the effective U.S. filing date, so that the particular month of publication is not an issue).

Jaiswal et al., "Reduced heart rate variability among youth with type 1 diabetes: the SEARCH CVD study.", Diabetes care, vol. 36, No. 1, Jan. 1, 2013, pp. 157-162.

Kamel et al., "Clinical disorders of hyperkalemia", Seldin and Giebisch's the Kidney, Academic Press, Jan. 1, 2013, pp. 1741-1772.

Kraus et al., "Comparison of the AliveCor® ECG device for the iPhone with a reference standard electrocardiogram", ACVIM Seattle, May 1, 2013, 1 pp.

Kudat et al., "Heart rate variability in diabetes patients", Journal of international medical research, vol. 34, No. 3, May 2006, pp. 291-296.

Laitinen et al., "Electrocardiographic alterations during hyperinsulinemic hypoglycemia in healthy subjects", Annals of Noninvasive Electrocardiology, vol. 13, No. 2, Apr. 2018, pp. 97-105.

Laitio et al., "The role of heart rate variability in risk stratification for adverse postoperative cardiac events", Anesthesia & Analgesia, vol. 105, No. 6, Dec. 1, 2007, pp. 1548-1560.

Levy et al., "The Effects of Electrolyte Disorders on Excitable Membranes", Dec. 1, 2008, 21 pp.

Malliani et al., "Cardiovascular Neural Regulation Explored in the Frequency Domain", Circulation, vol. 84, No. 2, Aug. 1991, pp. 482-492.

Nguyen et al., "Effects of hyperglycemia on variability of RR, QT and corrected QT intervals in Type 1 diabetic patients", 35th Annual International Conference of the IEEE Engineering in Medicine and Biology Society, Jul. 3, 2013, pp. 1819-1822.

Nguyen et al., "Identification of hypoglycemia and hyperglycemia in type 1 diabetic patients using ECG parameters", 2012 Annual International Conference of the IEEE Engineering in Medicine and Biology Society, Aug. 28, 2012, pp. 2716-2719.

Porumb et al., "Precision medicine and artificial intelligence: a pilot study on deep learning for hypoglycemic events detection based on ECG", Scientific Reports, vol. 10, No. 1, Jan. 13, 2020, pp. 1-16.

Ribeiro et al., "Relationship between diabetes mellitus and heart rate variability in community-dwelling elders", Medicina, vol. 53, No. 6, Dec. 2017, pp. 375-379.

Shin et al., "Assessment of autonomic regulation of heart rate variability by the method of complex demodulation", IEEE Transactions on Biomedical Engineering, vol. 36, No. 2, Feb. 1989, 10 pp.

Singh et al., "Association of hyperglycemia with reduced heart rate variability (The Framingham Heart Study)", The American journal of cardiology, vol. 86, No. 3, Aug. 1, 2000, pp. 309-312.

Suys et al., "Glycemia and corrected QT interval prolongation in young type 1 diabetic patients: what is the relation?", Diabetes care, vol. 29, No. 2, Feb. 1, 2006, pp. 427-429.

Tarvainen et al., "Kubios HRV-heart rate variability analysis software", Computer methods and programs in biomedicine, vol. 113, No. 1, Jan. 1, 2014, pp. 210-220.

Task Force of the European Society of Cardiology and the North American Society of Pacing and Electrophysiology, "Heart Rate Variability: Standards of measurement, physiological interpretation and clinical use", Circulation, vol. 93, No. 5, American Heart Association, Mar. 1, 1996, pp. 1043-1065.

Velagapudi et al., "Computer-assisted image processing 12 lead ECG model to diagnose hyperkalemia", Journal of electrocardiology, vol. 50, No. 1, Jan. 1, 2017, pp. 131-138.

Volgman et al., "O016 AliveCor Heart Monitoring: Is it a practical alternative to a traditional ECG monitor for a developing nation?", Global Heart, vol. 9, No. 1, Mar. 1, 2014, pp. e4-e5.

International Preliminary Report on Patentability from International Application No. PCT/US2022/041563 dated Mar. 14, 2024, 11 pp.

\* cited by examiner

CARDIAC AND TEMPERATURE MONITOR

This application claims the benefit of U.S. Provisional Application Ser. No. 63/239,932 (filed Sep. 1, 2021), which is entitled "CARDIAC AND TEMPERATURE MONITOR" and is incorporated by reference herein in its entirety.

TECHNICAL FIELD

This disclosure is related to a medical system for assessing blood glucose level of a patient.

BACKGROUND

Physiological characteristic sensors may be use in a variety of specialized applications. For example, implantable sensors may be used in glucose monitoring systems to facilitate treatment of diabetes, such as monitoring glucose levels over time for adjusting a treatment regimen that includes regular administration of insulin to a patient. Naturally produced insulin may not control the glucose level in the bloodstream of a diabetes patient due to insufficient production of insulin and/or due to insulin resistance. To control the glucose level, a patient's therapy routine may include dosages of basal insulin and bolus insulin based on a monitored and/or assessed glucose level.

SUMMARY

Examples of a medical system disclosed here include processing circuitry configured to receive a cardiac signal from sensing circuitry and a temperature signal from a temperature sensor. The cardiac signal is indicative of a cardiac characteristic of a patient. The temperature signal is indicative of a body temperature of the patient. The medical system is configured to receive the cardiac signal over a beat window (e.g., over 30 heart beats of the patient), and determine a representative cardiac measure indicative of the cardiac signal received over the beat window. The medical system is configured to receive the temperature signal (e.g., over the beat window) and determine a representative temperature measure indicative of the temperature signal received. The medical system is configured to assess whether the blood glucose level of the patient is outside a euglycemic range based on both the representative cardiac measure and the representative temperature measure determined.

In an example, a medical system comprises: a memory; and processing circuitry operably connected to the memory, wherein the processing circuitry is configured to: define a cardiac threshold for a patient, wherein the cardiac threshold is indicative of an electrical activity of a heart of the patient when the patient is in a euglycemic range, define a temperature threshold for the patient, wherein the temperature threshold is indicative of a body temperature of the patient when the patient is in the euglycemic range, store the cardiac threshold and the temperature threshold using the memory, receive a cardiac signal indicative of the electrical activity of the heart of the patient and a temperature signal indicative of a body temperature of the patient, and assess a glycemic state of the patient by: retrieving the cardiac threshold and the temperature threshold from the memory, determining a representative cardiac measure using the cardiac signal, comparing the representative cardiac measure and the cardiac threshold to determine a cardiac deviation, determining a representative temperature measure using the temperature signal, comparing the representative temperature measure and the temperature threshold to determine a temperature deviation, and generating a positive communication when the cardiac deviation meets or exceeds a cardiac deviation limit and the temperature deviation exceeds or exceeds a temperature deviation limit.

In an example, a medical system comprises: a cardiac sensor configured to sense a cardiac signal of a patient; a temperature sensor configured to sense a temperature signal of the patient; a memory; and processing circuitry operably connected to the memory, wherein the processing circuitry is configured to: define a cardiac threshold for the patient, wherein the cardiac threshold is indicative of an electrical activity of a heart of the patient when the patient is in a euglycemic range, define a temperature threshold for the patient, wherein the temperature threshold is indicative of a body temperature of the patient when the patient is in the euglycemic range, store the cardiac threshold and the temperature threshold using the memory, determine one or more cardiac measures using the cardiac signal and determine a representative cardiac measure using the one or more cardiac measures; determine one or more temperature measures using the temperature signal and determine a representative temperature measure using the one or more temperature measures; and assess a glycemic state of the patient by: retrieving the cardiac threshold and the temperature threshold from the memory, comparing the representative cardiac measure and the cardiac threshold to determine a cardiac deviation, comparing the representative temperature measure and the temperature threshold to determine a temperature deviation, and generating a positive communication when the cardiac deviation meets or exceeds a cardiac deviation limit and the temperature deviation meets or exceeds a temperature deviation limit.

In an example, a method comprises: defining, using processing circuitry, a cardiac threshold for a patient, wherein the cardiac threshold is indicative of an electrical activity of a heart of the patient when the patient is in a euglycemic range, defining, using the processing circuitry, a temperature threshold for the patient, wherein the temperature threshold is indicative of a body temperature of the patient when the patient is in the euglycemic range, receiving, using the processing circuitry, a cardiac signal indicative of the electrical activity of the heart of the patient and a temperature signal indicative of a body temperature of the patient, storing, using the processing circuitry, the cardiac threshold and the temperature threshold in a memory, and assessing a glycemic state of the patient by using the processing circuitry to: retrieve the cardiac threshold and the temperature threshold from the memory, determine a representative cardiac measure using the cardiac signal, compare the representative cardiac measure and the cardiac threshold to determine a cardiac deviation, determine a representative temperature measure using the temperature signal, compare the representative temperature measure and the temperature threshold to determine a temperature deviation, and generate a positive communication when the cardiac deviation meets or exceeds a cardiac deviation limit and the temperature deviation exceeds or exceeds a temperature deviation limit.

The details of one or more examples are set forth in the accompanying drawings and the description below. Other features, objects, and advantages will be apparent from the description and drawings, and from the claims.

DETAILED DESCRIPTION

Figure 1:
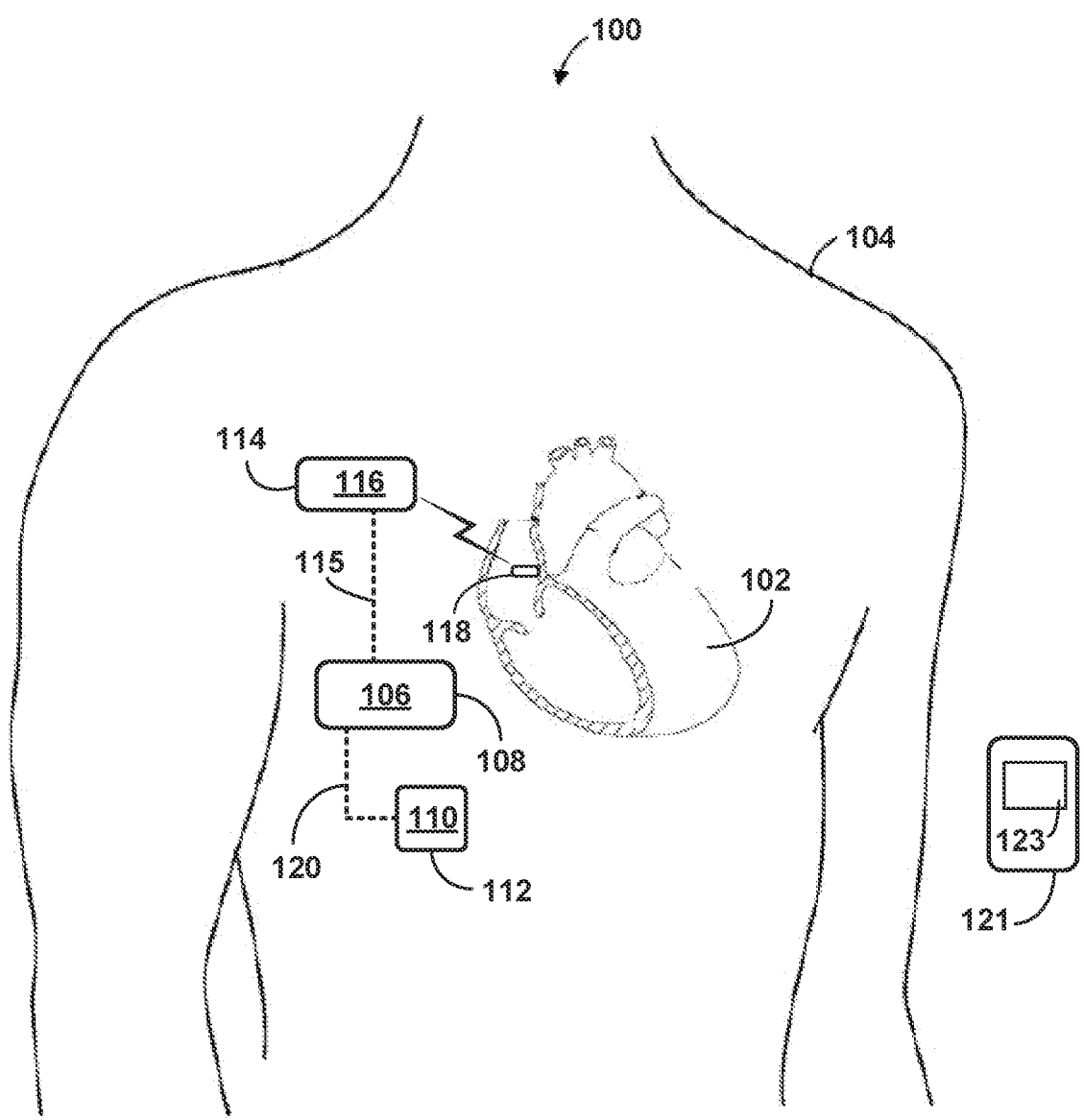
FIG. 1 is a conceptual diagram illustrating an example medical system including a cardiac sensor and a temperature sensor.

This disclosure describes a medical system configured to assess a blood glucose level of a patient using a cardiac signal indicative of the electrical activity of the patient's heart and a temperature signal indicative of a body temperature of the patient. The cardiac signal may be, for example, an electrocardiogram (ECG), an electrogram (EGM), or another measure (for example, wearables), and may be obtained from inside or outside the body. The medical system is configured to receive the cardiac signal over a beat window (e.g., over 30 heart beats of the patient), and determine a representative cardiac measure indicative of the cardiac signal received over the beat window. The medical system is configured to receive the temperature signal (e.g., over the beat window) and determine a representative temperature measure indicative of the temperature signal received. The medical system is configured to assess whether the blood glucose level of the patient is outside a euglycemic range based on both the representative cardiac measure and the representative temperature measure determined.

The medical system is configured to compare the representative cardiac measure and a cardiac threshold. The representative cardiac measure may be based on a cardiac measure correlated with a current glycemic state of the patient such as, for example, an R-T amplitude ratio, or another cardiac measure. The cardiac threshold may be indicative of the electrical activity of the patient's heart when the blood of the patient is substantially within a euglycemic range. The medical system is configured to compare the representative cardiac measure with the cardiac threshold to assess whether the blood glucose level of the patient may have departed from a euglycemic range. In examples, the medical system compares the representative cardiac measure and the cardiac threshold and determines a cardiac deviation, and uses the cardiac deviation to assess whether the glucose level of the patient has departed from the euglycemic range.

The medical system is further configured to compare the representative temperature measure and a temperature threshold. The representative temperature measure may be based on a substantially current temperature of the body of the patient. The temperature threshold may be indicative of the temperature of the body of the patient when the blood of the patient is substantially within a euglycemic range. The medical system is configured to compare the representative temperature measure with the temperature threshold to assess whether the blood glucose level of the patient may have departed from a euglycemic range. In examples, the medical system compares the representative temperature measure and the temperature threshold and determines a temperature deviation and uses the temperature deviation to assess whether the glucose level of the patient has departed from the euglycemic range.

The medical system is configured to treat the cardiac deviation and the temperature deviation as possible indications the blood glucose level is outside a euglycemic range. The medical system is configured to generate a positive communication when both the cardiac deviation and the temperature deviation combined indicate the patient may be outside the euglycemic range, such that the temperature deviation acts a check against the cardiac deviation, and vice-versa. In examples, the medical system may be configured to generate a negative communication when at least one or the cardiac deviation or the temperature deviation fail to indicate the patient may be outside the euglycemic range.

The medical system may be configured to periodically update the representative cardiac measure and the representative temperature measure, such that the representative cardiac measure and the representative temperature measure remain substantially indicative of a current physiological state of the patient. In examples, the medical system is configured to periodically redefine the beat window (e.g., as the cardiac signal indicates additional cardiac cycles of the patient) so the representative cardiac measure and the representative temperature measure remain substantially indicative of the current physiological state. The medical system may redetermine and update the representative cardiac measure and/or representative temperature measure when the beat window is redefined, such that the representative cardiac measure and/or representative temperature measure are indicative of the cardiac signal and temperature signal received over the redefined beat window.

The medical system may be configured to update the cardiac deviation using the updated representative cardiac measure and update the temperature deviation using the updated representative temperature measure. The medical system may be configured to issue another positive communication when both the updated cardiac deviation and the updated temperature deviation indicate the patient may be outside the euglycemic range. The medical system may be configured to configured to issue another negative communication when at least one of the updated cardiac deviation or the updated temperature deviation fail to indicate the patient may be outside the euglycemic range. The medical system may be configured to continue redefining the beat window, updating the representative cardiac measure, and updating the representative temperature measure to issue positive communications when the cardiac deviation and the temperature deviation indicate the patient may be outside the euglycemic range, and issue negative communications when at least one of the cardiac deviation or temperature deviation fail to indicate the patient may be outside the euglycemic range.

Hence, the medical system is configured to periodically redefine the beat window and update the representative cardiac measure and the representative temperature measure to assess a current glycemic state of the patient. The medical system is configured to issue a positive communication when the thus updated representative cardiac measure and representative temperature measure indicate the patient may be outside a euglycemic range, based on comparisons to a cardiac threshold and temperature threshold indicative of the patient being substantially within the euglycemic range. The medical system is configured to assess the representative cardiac measure and the representative temperature measure when the beat window is redefined, such that resulting cardiac deviation and temperature deviation are indicative of a current physiological state of the patient. The medical system may be configured to determine the cardiac deviation and the temperature deviation in a repeating process based on updates to the beat window, such that medical system may evaluate the glycemic state of the patient on a relatively continuous basis.

In examples, the medical system is configured to track the instances (e.g., the positive communications) where the cardiac deviation and the temperature deviation indicate the patient may be outside the euglycemic range. The medical system may be configured to issue a system alert based on the tracked instances. For example, the medical system may be configured to track a quantity of positive communications issued and issue the system alert when the quantity of positive communications issued causes the medical system to exceed an alert threshold (e.g., 60). Utilizing the alert threshold may allow the medical system to reduce and/or substantially eliminate spurious system alerts and/or alerts based on positive communication in response to a temporary departure of the patient from the euglycemic state.

In examples, the medical system is configured to track the issue of positive communications relative to the issue of negative communications, and issue the system alert based on the issue of positive communications relative to the issue of negative communications. In examples, the issue of positive communications relative to the issue of negative communications defines the alert threshold. For example, the medical system may be configured to increment a tracking counter when a positive communication is issued and decrement the tracking counter when a negative communication is issued. The medical system may be configured to issue the system alert when the tracking counter exceeds the alert threshold (e.g., 60). Communicating the system alert based on the issue of positive communications relative to the issue of negative communications allows the medical system to substantially weight the alert threshold toward more recently issued positive communications, such that system alerts issued more closely align with the current glycemic state of the patient.

The medical system may be configured to determine the representative cardiac measure of the patient and the representative temperature measure of the patient using substantially separate physiological measurements of the patient. For example, the medical system may determine the representative cardiac measure based on a cardiac signal received from a cardiac sensor (e.g., an electrode) and determine the representative temperature measure based on a temperature signal received from a temperature sensor. The cardiac sensor may be configured to sense the electrical activity of the heart without regard to temperatures sensed by the temperature sensor, and the temperature sensor may be configured to sense temperatures without regard to electrical activity sensed by the cardiac sensor. The medical system may be configured to treat either of the resulting representative cardiac measure and representative temperature measure as indicative of the glycemic state of the patient. However, the medical system may be configured provide the system alert only when both the representative cardiac measure and the representative temperature measure indicating the patient may be outside the euglycemic range, such that the representative temperature measure acts as a substantially independent check against the representative cardiac measure, and vice-versa.

The medical system may be configured to determine the cardiac threshold against which the representative cardiac measure is evaluated based on prior monitoring of the patient. The medical system may be configured to receive a thresholding cardiac signal from the patient and determine the cardiac threshold using the thresholding cardiac signal. The thresholding cardiac signal may be indicative of the electrical activity of the patient's heart, and may be received from the same source (e.g., the cardiac sensor) as the cardiac signal subsequently utilized to periodically determine the representative cardiac measure. The medical system may be configured to receive the thresholding cardiac signal when the patient is or is assumed to be substantially euglycemic, such that the cardiac threshold determined is indicative of cardiac activity when the patient is in a euglycemic state.

Similarly, the medical system may be configured to determine the temperature threshold against which the representative temperature measure is evaluated based on prior monitoring of the patient. The medical system may be configured to receive a thresholding temperature signal when the patient is substantially euglycemic and determine the temperature threshold based on the thresholding temperature signal. The thresholding temperature signal is indicative of a body temperature of the patient, and may be received from the same source (e.g., the temperature sensor) as the temperature signal subsequently utilized to periodically determine the representative temperature measure. The medical system may be configured to receive the thresholding temperature signal when the patient is or is assumed to be substantially euglycemic, such that the temperature threshold determined is indicative of a body temperature when the patient is in a euglycemic state.

Subsequent to determination of the cardiac threshold and the temperature threshold, the medical system may monitor the patient to define and periodically update the representative cardiac measure and the representative temperature measure. In examples, the medical system is configured to receive the cardiac signal over a beat window of the patient and determine one or more sensed cardiac measures based on the cardiac signal received. The medical system may be configured to determine the representative cardiac measure for the beat window using the one or more sensed cardiac measures. In examples, the sensed cardiac signal is indicative of an electrocardiogram (ECG) signal, and an individual sensed cardiac measure is based on some portion of an ECG wave segment of the ECG signal. The individual sensed cardiac measure may be based on a signal feature defined by the ECG wave segment. For example, the individual sensed cardiac measure may be based on one or more of an R-T amplitude ratio and/or one or more portions of a P-wave, Q-wave, R-wave, S-wave, and/or T-wave, such as an ST interval, an ST elevation, a T wave amplitude, a T-peak to T-end interval, a T slope, a T-wave area, a T-wave asymmetry, an R-wave amplitude, a T-wave amplitude, a heart rate variability (HRV), a QT internal variability (QTV), a corrected QT interval (QTc), and/or other identifiable characteristics of the ECG wave segment. The medical system is configured to determine the representative cardiac measure based on a set (e.g., a population) of sensed cardiac measures, where the set of sensed cardiac measure includes one or more (e.g., a plurality) of individual sensed cardiac measures determined during the current beat window defined for the patient.

In examples, the medical system is configured define the representative cardiac measure as a summary statistic indicative of the set of sensed cardiac measures. For example, the representative cardiac measure may be an average of the set of sensed cardiac measures determined over the beat window, or some other statistical parameter substantially characterizing the set of sensed cardiac measures determined over the beat window. The medical system is configured to compare the representative cardiac measure thus determined with the cardiac threshold and evaluate whether the comparison indicates the patient may be in a non-euglycemic state.

The medical system is configured to receive the temperature signal during the beat window defined for the patient and determine one or more sensed temperature measures based on the temperature signal received. The medical system may be configured to determine the representative temperature measure based on a set (e.g., a population) of sensed temperature measures determined, where the set of sensed temperature measures includes one or more (e.g., a plurality) individual sensed temperature measures determined during the current beat window defined for the patient. In examples, the medical system is configured define the representative temperature measure as a summary statistic indicative of the set of sensed temperature measures received over the beat window. For example, the representative temperature measure may be an average of the set of sensed temperature measures, or some other statistical parameter substantially characterizing the set of sensed temperature measures. In some examples, the medical system is configured to determine a single temperature measure associated with the beat window, and the representative temperature measure is indicative of the single temperature measure. The medical system is configured to compare the representative temperature measure thus determined with the temperature threshold and evaluate whether the comparison indicates the patient may be in a non-euglycemic state.

The beat window may be a window over which a quantity of heart beats and/or cardiac cycles occurs (e.g., 30 heartbeats of the patient). In examples, the beat window is a sliding beat window based on the heartbeat of the patient. The medical system may be configured to re-determine the representative cardiac measure when the set of sensed cardiac measures within the sliding beat window is altered (e.g., when the addition and/or deletion of a sensed cardiac measure alters the elements of the set and/or members of the population). For example, the medical system may be configured to track a chronological sequence in which the one or more sensed cardiac measures are determined from the cardiac signal. As the medical system determines a newest sensed cardiac measure (e.g., based on recognizing a new cardiac cycle in the cardiac signal), the medical system may be configured to update the set of sensed cardiac measures to include the newest sensed cardiac measure and discard an older sensed cardiac measure, such as the oldest sensed cardiac measure in the set. The medical system may be configured to re-determine the representative cardiac measure based on the updated set of sensed cardiac measures. Hence, the medical system may be configured to determine the representative cardiac measure based on the sliding beat window for the patient, such that the representative cardiac measure is indicative of a current cardiac state of the patient. The medical system may update the cardiac deviation based on the updated representative cardiac measure, such that the cardiac deviation is indicative of a current glycemic state of the patient.

In similar manner, the medical system may be configured to re-determine the representative temperature measure when a set of sensed temperatures is altered (e.g., when the addition and/or deletion of a sensed temperature alters the elements of the set and/or members of the population). The medical system may be configured to track a chronological sequence in which one or more sensed temperature measures are determined from the temperature signal. The medical system may be configured to update a single temperature measure or set of temperature measures to include the newest sensed temperature measure and discard an older sensed temperature measure, such as an oldest sensed temperature measure in the set. The medical system may be configured to re-determine the representative temperature measure based on the updated single temperature measure or set of sensed temperature measures. Hence, the medical system may be configured to determine the representative temperature measure such that the representative temperature measure is indicative of a current temperature state of the patient. The medical system may update the temperature deviation based on the updated representative temperature measure, such that the temperature deviation is indicative of a current glycemic state of the patient.

The medical system includes processing circuitry configured to receive the cardiac signal and the temperature signal. The processing circuitry may be configured determine the cardiac threshold, the temperature threshold, the representative cardiac measure, and/or the representative temperature measure. The processing circuitry is configured to determine the cardiac deviation using the representative cardiac measure and the cardiac threshold, and the temperature deviation using the representative temperature measure and the temperature threshold. The processing circuitry may be configured to redefine the beat window (e.g., to track a sliding beat window) and update the representative cardiac measure and the representative temperature measure based on the redefined beat window. The processing circuity may be configured to issue a positive communication when the cardiac deviation and the temperature deviation indicate the patient may be outside of the euglycemic range. In examples, the processing circuity is configured to issue a negative communication when at least one of the cardiac deviation or temperature deviation fails to indicate the patient may be outside of the euglycemic range. The processing circuitry may be configured to issue a system alert based on the positive communications issued (e.g., using a tracking counter).

In some examples, the medical system includes a cardiac sensor. The cardiac sensor may be configured to provide the cardiac signal to the processing circuitry. In examples, the cardiac sensor includes one or more electrodes configured to contact the patient and sense the cardiac signal generated by the heart of the patient. In other examples, the processing circuitry may be configured to receive the cardiac signal from another system or device configured to detect and communicate the cardiac signal. For example, the processing circuitry may be configured to receive the cardiac signal from an implantable and/or wearable cardiac system configured to sense a cardiac signal of the patient and communicate the cardiac signal to the processing circuitry.

The medical system may include one or more temperature sensors configured to sense the temperature signal indicative of a temperature of the body of the patient. The one or more temperature sensors may be configured to provide the temperature signal to the processing circuitry. In other examples, the processing circuitry may be configured to receive the temperature signal from another system or device configured to detect and communicate the temperature signal. For example, the processing circuitry may be configured to receive the temperature signal from an implantable and/or wearable system configured to sense a temperature signal of the patient and communicate the temperature signal to the processing circuitry. The processing circuitry may be configured to receive the temperature signal from a portable device such as a thermometer configured to sense the temperature signal of the patient and communicate the temperature signal to the processing circuitry.

In examples, the medical system includes a wearable, implantable, and/or portable device including a device housing configured to contact a body (e.g., a torso) of the patient. The device housing may mechanically support the processing circuitry, the cardiac sensor, and/or the temperature sensor.

The medical system may include a user interface for presenting information to and receiving input from a patient and/or clinician. For example, the user interface may be configured to generate a visual display viewable by the patient and/or clinician and providing information such as system alerts, a graph of system alerts over a time period, a currently estimated euglycemic state, a representative glucose level of the patient, a graph of estimated euglycemic states and/or representative glucose levels over a time period, a period of use since the most recent determination of the representative cardiac measure and/or representative temperature measure, and/or other information arising through operation of the medical system. The user interface may be configured to cause the processing circuitry to perform certain functions based on an input from the patient. For example, user interface may cause the processing circuitry to determine the representative cardiac measure, determine the representative temperature measure, alter a width of a beat window (e.g., alter a number of heart beats defining the beat window), and/or other functions.

The medical system may be implemented using one or more computer programs implemented on programmable computers, such as computers that include, for example, processing capabilities, data storage (e.g., volatile or nonvolatile memory and/or storage elements), input devices, and output devices. Program code and/or logic described herein may be applied to input data to perform the functionality described herein and generate desired output information. The programs may be stored on any suitable device, e.g., a storage media, readable by a general or special purpose program running on a computer system (e.g., including processing apparatus) and configuring the computer system to perform functions described herein. Computer-implemented instructions, data structures, screen displays, and other data under aspects of the technology may be stored or distributed on computer-readable storage media, including magnetically or optically readable computer disks, as microcode on semiconductor memory, nanotechnology memory, organic or optical memory, or other portable and/or non-transitory data storage media. In some embodiments, aspects of the technology may be distributed over the Internet or over other networks (e.g., a Bluetooth network) on a propagated signal on a propagation medium (e.g., an electromagnetic wave(s), a sound wave) over a period of time, or may be provided on any analog or digital network (packet switched, circuit switched, or other scheme).

FIG. 1 is a conceptual diagram of an example medical system 100 configured to assess a glycemic state based on a cardiac signal indicative of the cardiac activity of a heart 102 of a patient 104 and a temperature signal indicative of a body temperature of patient 104. Medical system 100 includes processing circuitry 106 mechanically supported within a device housing 108. Medical system 100 may include a temperature sensor 110 supported by a temperature sensor housing 112 and a cardiac sensor 114 (e.g., one or more electrodes) supported by a cardiac sensor housing 116. In examples, device housing 108 mechanically supports both processing circuitry 106 and one or more of temperature sensor 110 and/or cardiac sensor 114.

Processing circuitry 106 is configured to receive a cardiac signal (e.g., an ECG or EGM signal) indicative of the electrical activity of heart 102 of patient 104. Cardiac sensor 114 may be configured to sense the cardiac signal. In examples, processing circuitry 106 is configured to receive the cardiac signal from cardiac sensor 114 via a communication link 115. Cardiac sensor 114 may be configured to sense and communicate the cardiac signal from a position outside of heart 102 and/or using additional devices located in closer proximity to heart 102, such as sensor 118. Cardiac sensor 114 may be configured to sense the cardiac signal of heart 102 and communicate the cardiac signal to processing circuitry 106 (e.g., via communication link 115). Processing circuitry 106 is further configured to receive a temperature signal indicative of a temperature of patient 104 from temperature sensor 110. For example, processing circuitry 106 may be configured to receive the temperature signal via a communication link 120.

Processing circuitry 106 may be configured to determine a cardiac threshold for patient 104 based on physiological parameters sensed from patient 104 (e.g., using cardiac sensor 114) when a glucose level of the blood of patient 104 is in, considered to be in, and/or assumed to be in a euglycemic range. The cardiac threshold may be indicative of the electrical activity of the heart 102 when the blood glucose of patient 104 is substantially within the euglycemic range. In examples, processing circuitry 106 is configured to determine the cardiac threshold by substantially monitoring the cardiac signal provided by cardiac sensor 114 over a thresholding window. In examples, the thresholding window is defined by a physiological parameter of patient 104, such as a certain number of heartbeats (e.g., 30) identified within the cardiac signal by processing circuitry 106.

Processing circuitry 106 may be configured to define the cardiac threshold by defining a set of individual thresholding cardiac measures over the thresholding window, with each individual thresholding cardiac measure describing cardiac activity (e.g., a cardiac cycle) that occurred within the thresholding window. In examples, the cardiac signal is indicative of an electrocardiogram (ECG) signal, and an individual thresholding cardiac measure is based on some portion of an ECG wave segment of the ECG signal. The individual thresholding cardiac measure may be based on a signal feature defined by the ECG wave segment. For example, the individual thresholding cardiac measure may be based on one or more of an R-T amplitude ratio and/or one or more portions of a P-wave, Q-wave, R-wave, S-wave, and/or T-wave, such as an ST interval, an ST elevation, a T wave amplitude, a T-peak to T-end interval, a T slope, a T-wave area, a T-wave asymmetry, an R-wave amplitude, a T-wave amplitude, a heart rate variability (HRV), a QT internal variability (QTV), a corrected QT interval (QTc), absolute QRST integral, and/or other identifiable characteristics of the ECG wave segment.

Processing circuitry 106 may be configured to determine the cardiac threshold using a summary statistic applied to the set of individual thresholding cardiac measures gathered over the thresholding window. The summary statistic may be a statistical parameter describing a characteristic of the set of individual thresholding cardiac measures. In examples, the summary statistic defines a statistical value (e.g., an average value or another statistical value) indicative of the set of individual thresholding cardiac measures. Processing circuitry 106 may be configured to determine the cardiac threshold by applying the summary statistic to the set of individual thresholding cardiac measures gathered over the thresholding window and determining a statistical value describing the set of individual thresholding cardiac measures gathered over the thresholding window.

In examples, an individual thresholding cardiac measure correlates with a glycemic state of the blood of patient 104, such that the glycemic state of the blood of patient 104 may be assessed and/or substantially determined by observing the individual thresholding cardiac measure. The cardiac threshold may be indicative of a set of individual thresholding cardiac measures which occur over the thresholding window. Processing circuitry 106 may be configured to determine the cardiac threshold by defining a summary statistic (e.g., an average) describing the set of thresholding cardiac measures determined within the thresholding window. Hence, the cardiac threshold may be indicative of an euglycemic range of blood glucose level within patient 104.

Processing circuitry 106 may be configured to determine a temperature threshold for patient 104 based on physiological parameters sensed from patient 104 (e.g., using temperature sensor 110) when a glucose level of the blood of patient 104 is in, considered to be in, and/or assumed to be in a euglycemic range. The temperature threshold may be indicative of a body temperature of the patient 104 when the blood of patient 104 is substantially within the euglycemic range. In examples, processing circuitry 106 is configured to determine the temperature threshold by substantially monitoring the temperature signal provided by temperature sensor 110 (e.g., over the thresholding window). Processing circuitry 106 may be configured to define the temperature threshold by defining a set of individual thresholding temperature measures (e.g., over the thresholding window), with each individual thresholding temperature measure describing a temperature of the body of patient 104. In some examples, processing circuitry 106 may be configured to define a single thresholding temperature measure and base the temperature threshold on the single thresholding temperature measure defined. Hence, the temperature threshold may be indicative of an euglycemic range of blood glucose level within patient 104.

Processing circuitry 106 may be configured to determine the temperature threshold using a summary statistic applied to the set of individual thresholding temperature measures. The summary statistic used for the temperature threshold may be the same or a different summary statistic used for the cardiac threshold. The summary statistic may be a statistical parameter describing a characteristic of the set of individual thresholding temperature measures. In examples, the summary statistic defines a statistical value (e.g., an average value or another statistical value) indicative of the set of individual thresholding temperature measures. Processing circuitry 106 may be configured to determine the temperature threshold by applying the summary statistic to the set of individual thresholding temperature measures and determining a statistical value describing the set of individual thresholding temperature measures.

Processing circuitry uses the cardiac threshold and the temperature threshold thus determined to assess the glycemic state of patient 104, based on comparison with a representative cardiac measure and a representative temperature measure subsequently determined over a beat window. The representative cardiac measure and the representative temperature measure are periodically or substantially continuously updated by processing circuitry 106, such that the representative cardiac measure and the representative temperature measure reflect a substantially current physiological state of patient 104. Processing circuitry 106 is configured to compare the representative cardiac measure (indicative of a current glycemic state of patient 104) with the cardiac threshold (indicative of a euglycemic state of patient 104) and determine a cardiac deviation. Processing circuitry 106 is configured to compare the representative temperature measure (indicative of a current glycemic state of patient 104) with the temperature threshold (indicative of a euglycemic state of patient 104) and determine a temperature deviation.

Processing circuitry 106 is configured to periodically determine and/or update a representative cardiac measure for patient 104 based on physiological parameters sensed from patient 104 (e.g., using cardiac sensor 114), for comparison with the previously determined cardiac threshold. The representative cardiac measure may be indicative of the electrical activity of the heart 102 of patient 104. In examples, processing circuitry 106 is configured to determine the representative cardiac measure by substantially monitoring the cardiac signal provided by cardiac sensor 114 over a beat window. In examples, the beat window is defined by a physiological parameter of patient 104, such as a certain number of heartbeats (e.g., 30) identified within the cardiac signal by processing circuitry 106. In examples, the beat window is a sliding beat window which progresses based on the cardiac signal received from cardiac sensor 114, and processing circuitry 106 is configured to update the representative cardiac measure when the sliding beat window progresses.

Processing circuitry 106 may be configured to define the representative cardiac measure by defining a set of sensed cardiac measures over the beat window where, as discussed, each sensed cardiac measure describes cardiac activity (e.g., a cardiac cycle) that occurred within the beat window. In examples, a sensed cardiac measure correlates with a glycemic state of the blood of patient 104, such that the glycemic state of the blood of patient 104 may be assessed and/or substantially determined by observing the sensed cardiac measure. The representative cardiac measure may be indicative of a set of sensed cardiac measures which occur over the thresholding window. Processing circuitry 106 may be configured to determine the representative cardiac measure by defining a summary statistic (e.g., an average) describing the set of sensed cardiac measures determined within the beat window. Hence, the representative cardiac measure may be indicative of a euglycemic range of blood glucose level within patient 104.

Processing circuitry 106 may be configured to determine the representative cardiac measure using a summary statistic applied to the set of sensed cardiac measures gathered over the beat window. The summary statistic used for the representative cardiac measure may be the same or a different summary statistic used for the cardiac threshold and/or the temperature threshold. The summary statistic may be a statistical parameter describing a characteristic of the set of sensed cardiac measures. In examples, the summary statistic defines a statistical value (e.g., an average value or another statistical value) indicative of the set of sensed cardiac measures. Processing circuitry 106 may be configured to determine the representative cardiac measure by applying the summary statistic to the set of sensed cardiac measures gathered over a beat window and determining a statistical value describing the set of sensed cardiac measures gathered over the beat window.

In examples, the cardiac threshold and the representative cardiac measure are each defined by a summary statistic of a common signal feature, such as an R-T amplitude ratio, one or more portions of a P-wave, Q-wave, R-wave, S-wave, and/or T-wave, and/or a signal feature defined using combinations thereof. For example, the cardiac threshold may be defined by a particular summary statistic applied to a first plurality of particular signal features gathered during a thresholding window, and the representative cardiac measure may be defined by the particular summary statistic applied to a second plurality of the particular signal features gathered during a beat window. In other examples, cardiac threshold may be defined by a first summary statistic and/or a first signal feature, and the representative cardiac threshold may be defined by a second summary statistic different from the first summary statistic and/or a second signal feature different from the first signal feature.

Having determined the representative cardiac measure for the beat window, processing circuitry 106 is configured to compare the representative cardiac measure and the cardiac threshold. Processing circuitry 106 evaluates a cardiac deviation for the beat window based on the comparison. The cardiac deviation may be based on a departure of a value of the representative cardiac measure from a value of the cardiac threshold. Processing circuitry 106 uses the cardiac deviation as an indication that the glucose level of patient 104 may have departed from the euglycemic range. In examples, processing circuitry 106 compares the cardiac deviation to a cardiac deviation limit, and determines the glucose level of patient 104 may have departed from the euglycemic range when the cardiac deviation meets or exceeds the cardiac deviation limit. For example, processing circuitry 106 may be configured to determine the cardiac deviation based on a ratio of the representative cardiac measure and the cardiac threshold, and determines the glucose level of patient 104 may have departed from the euglycemic range when the ratio indicates the representative cardiac measure differs from the cardiac threshold by at least some amount, such as some percentage. In examples, processing circuitry 106 determines the glucose level of patient 104 may have departed from the euglycemic range when the representative cardiac measure differs from the cardiac threshold by at least 1%, at least 5%, at least 10%, or some other percentage. The cardiac deviation limit can be adjusted based on specific patient parameters.

Processing circuitry 106 may be configured to determine a representative temperature measure for patient 104 based on physiological parameters sensed from patient 104 (e.g., using temperature sensor 110) when a glucose level of the blood of patient 104 is in, considered to be in, and/or assumed to be in a euglycemic range. The representative temperature measure may be indicative of a body temperature of the patient 104 when the blood of patient 104 is substantially within the euglycemic range. In examples, processing circuitry 106 is configured to determine the representative temperature measure by substantially monitoring the temperature signal provided by temperature sensor 110 (e.g., over the beat window). Processing circuitry 106 may be configured to define the representative temperature measure by defining a set of sensed temperature measures (e.g., over the beat window), with each sensed temperature measure describing a temperature of the body of patient 104. In some examples, processing circuitry 106 may be configured to define a single temperature measure and base the representative temperature measure on the single temperature measure defined. Hence, the representative temperature measure may be indicative of a euglycemic range of blood glucose level within patient 104.

Processing circuitry 106 may be configured to determine the representative temperature measure using a summary statistic applied to the set of sensed temperature measures. The summary statistic used for the representative temperature measure may be the same or a different summary statistic used for the representative cardiac measure, the cardiac threshold, and/or the temperature threshold. The summary statistic may be a statistical parameter describing a characteristic of the set of sensed temperature measures. In examples, the summary statistic defines a statistical value (e.g., an average value or another statistical value) indicative of the set of sensed temperature measures. Processing circuitry 106 may be configured to determine the representative temperature measure by applying the summary statistic to the set of sensed temperature measures and determining a statistical value describing the set of sensed temperature measures.

In examples, the temperature threshold and the representative temperature measure are each defined by a separate summary statistic of one or more temperature measures (e.g., thresholding temperature measures or sensed temperature measures). For example, the temperature threshold may be defined by a specific summary statistic applied to a set of thresholding temperature measures gathered during a thresholding window, and the representative temperature measure may be defined by the specific summary statistic applied to a set of sensed temperature measures gathered during a beat window. The specific summary statistic may be, for example, an average or some other statistical parameter describing a characteristic of a set of members. In other examples, temperature threshold may be defined by a first summary statistic and the representative temperature measure may be defined by a second summary statistic different from the first summary statistic.

Having determined the representative temperature measure, processing circuitry 106 is configured to compare the representative temperature measure and the temperature threshold. Processing circuitry 106 evaluates a temperature deviation for the beat window based on the comparison. The temperature deviation may be based on a departure of a value of the representative temperature measure from a value of the temperature threshold. Processing circuitry 106 uses the temperature deviation as an indication that the glucose level of patient 104 may have departed from the euglycemic range. In examples, processing circuitry 106 compares the temperature deviation to a temperature deviation limit, and determines the glucose level of patient 104 may have departed from the euglycemic range when the temperature deviation meets or exceeds the temperature deviation limit. For example, processing circuitry 106 may be configured to determine the temperature deviation based on a ratio of the representative temperature measure and the temperature threshold, and determine the glucose level of patient 104 may have departed from the euglycemic range when the ratio indicates the representative temperature measure differs from the temperature threshold by at least some amount, such as some percentage. In examples, processing circuitry 106 determines the glucose level of patient 104 may have departed from the euglycemic range when the representative temperature measure differs from the temperature threshold by at least 1%, at least 5%, at least 10%, or some other percentage. The temperature deviation limit can be adjusted based on specific patient parameters.

Processing circuitry 106 is configured to treat the cardiac deviation as one possible indication the blood glucose level of the patient is outside a euglycemic range and treat the temperature deviation as another possible indication the blood glucose level of the patient is outside a euglycemic range, such that the temperature deviation acts a check against the cardiac deviation, and vice-versa. Processing circuitry 106 is configured to generate a positive communication when both the cardiac deviation exceeds the cardiac deviation limit and the temperature deviation exceeds the temperature deviation limit. Processing circuitry 106 may be configured to generate a negative communication when the cardiac deviation fails to exceed the cardiac deviation limit and/or the temperature deviation fails to exceed the temperature deviation limit.

Processing circuitry 106 may be configured to redefine the beat window (e.g., when the beat window is a sliding beat window) and determine the representative cardiac measure and the representative temperature measure for the redefined beat window. Processing circuitry 106 may be configured to determine a cardiac deviation and a temperature deviation for the redefined beat window, and issue a positive communication or a negative communication for the redefined beat window based on the determinations. Processing circuitry 106 may be configured to redefine the beat window based on a physiological parameter sensed from patient 104, such as an additional cardiac cycle (e.g., a heartbeat). In some examples, processing circuitry 106 may redefine the beat window based on a parameter independent of a physiological parameter of patient 104, such as an elapsed time. Processing circuitry 106 may be configured to periodically redefine the beat window and issue positive or negative communications over a defined period of time (e.g., over a substantially nocturnal period of patient 104, or substantially continuously over a 24 hour period).

Processing circuitry 106 may be is configured to track at least the positive communications issued over the defined period. Processing circuitry 106 may be configured to issue a system alert based on the tracked positive communications issued. In examples, processing circuitry 106 is configured to track a quantity of positive communications issued and issue a system alert when the quantity of positive communications issued causes an alert threshold to be exceeded. In examples, processing circuitry 106 is configured to track the issue of positive communications relative to the issue of negative communications, and issue the system alert based on the issue of positive communications relative to the issue of negative communications. The issue of positive communications relative to the issue of negative communications may define the alert threshold. For example, processing circuitry 106 may be configured to increment a tracking counter when a positive communication is issued and decrement the tracking counter when a negative communication is issued. Processing circuitry 106 may be configured to issue the system alert when the tracking counter exceeds the alert threshold (e.g., 60). Communicating the system alert based on the issue of positive communications relative to the issue of negative communications may allow processing circuitry 106 to substantially weight the alert threshold toward more recently issued positive communications, such that system alerts issued more closely align with the current glycemic state of the patient.

In examples, medical system 100 includes an external device 121 including a user interface 123. Processing circuitry 106 may be configured to communicate the system alert to external device 121. External device 121 may be configured to generate an output observable by patient 104 (e.g., a visual, audible, tactile, or some other alert perceivable by patient 104) to communicate the system alert to patient 104. External device 121 may be, for example, a smart phone, tablet, another external device, and/or some other device configured to receive the system alert from processing circuitry 106 and communicate the system alert to patient 104. In examples, external device 121 may be configured to generate an output observable by a clinician to communicate the system alert or other data to the clinician. For example, external device 121 may be a server and one or more processors configured to generate the output for the clinician.

In some examples, processing circuitry 106 may be configured to assess whether patient 104 is in a hypoglycemic state or a hyperglycemic state when the cardiac deviation and the temperature deviation indicate the blood glucose level of patient 104 may be outside the euglycemic range. Processing circuitry 106 may be configured to determine a Q-T interval for patient 104 (e.g., using cardiac sensor 114) and designate the glycemic state of patient 104 as hypoglycemic or hyperglycemic based on the Q-T interval. Processing circuitry 106 may be configured to communicate the glycemic state (e.g., hypoglycemic or hyperglycemic) to external device 121.

Figure 2:
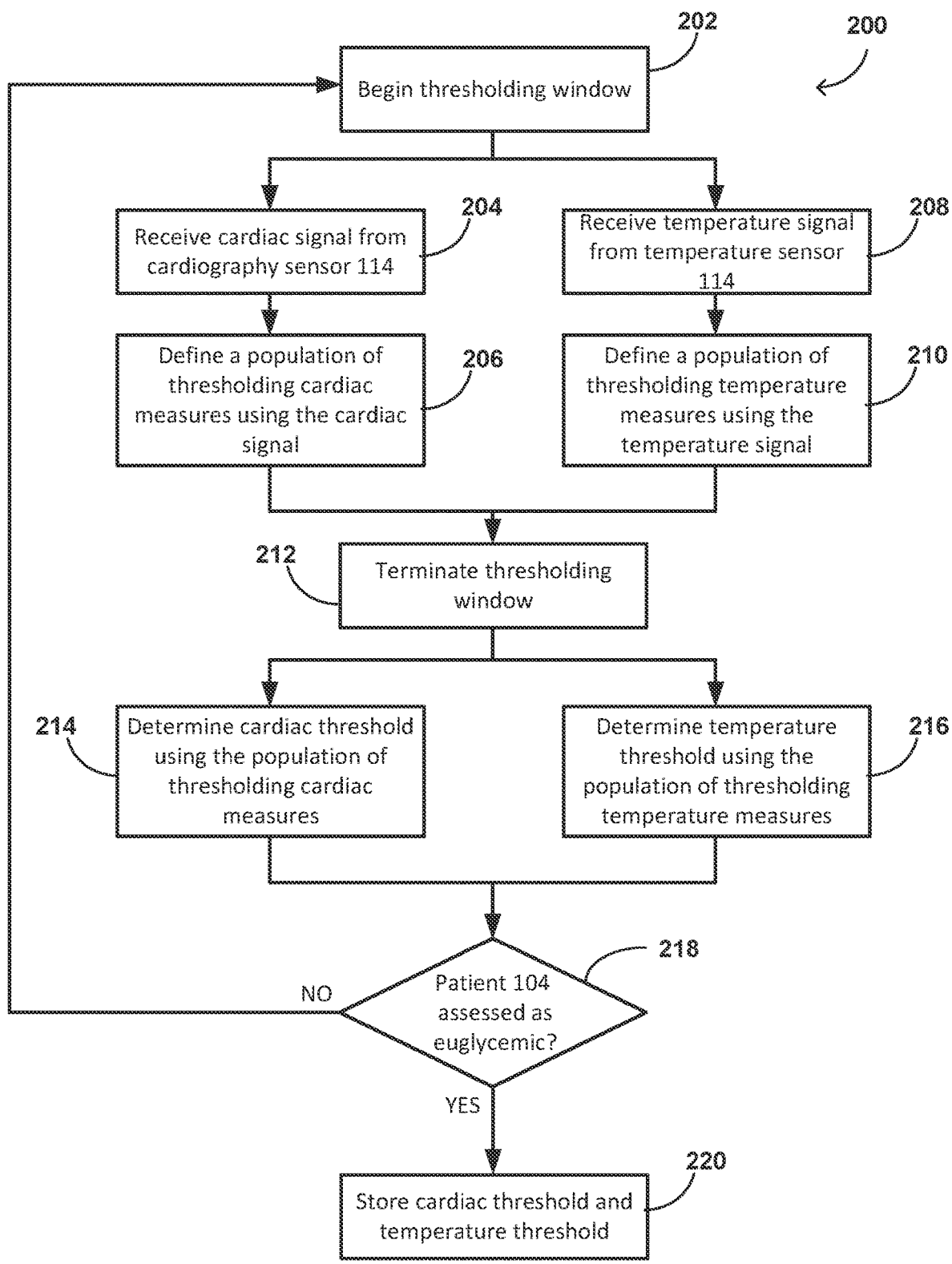
FIG. 2 is an example flow diagram for determining a cardiac threshold and a temperature threshold using processing circuitry of the medical system.
Figure 3:
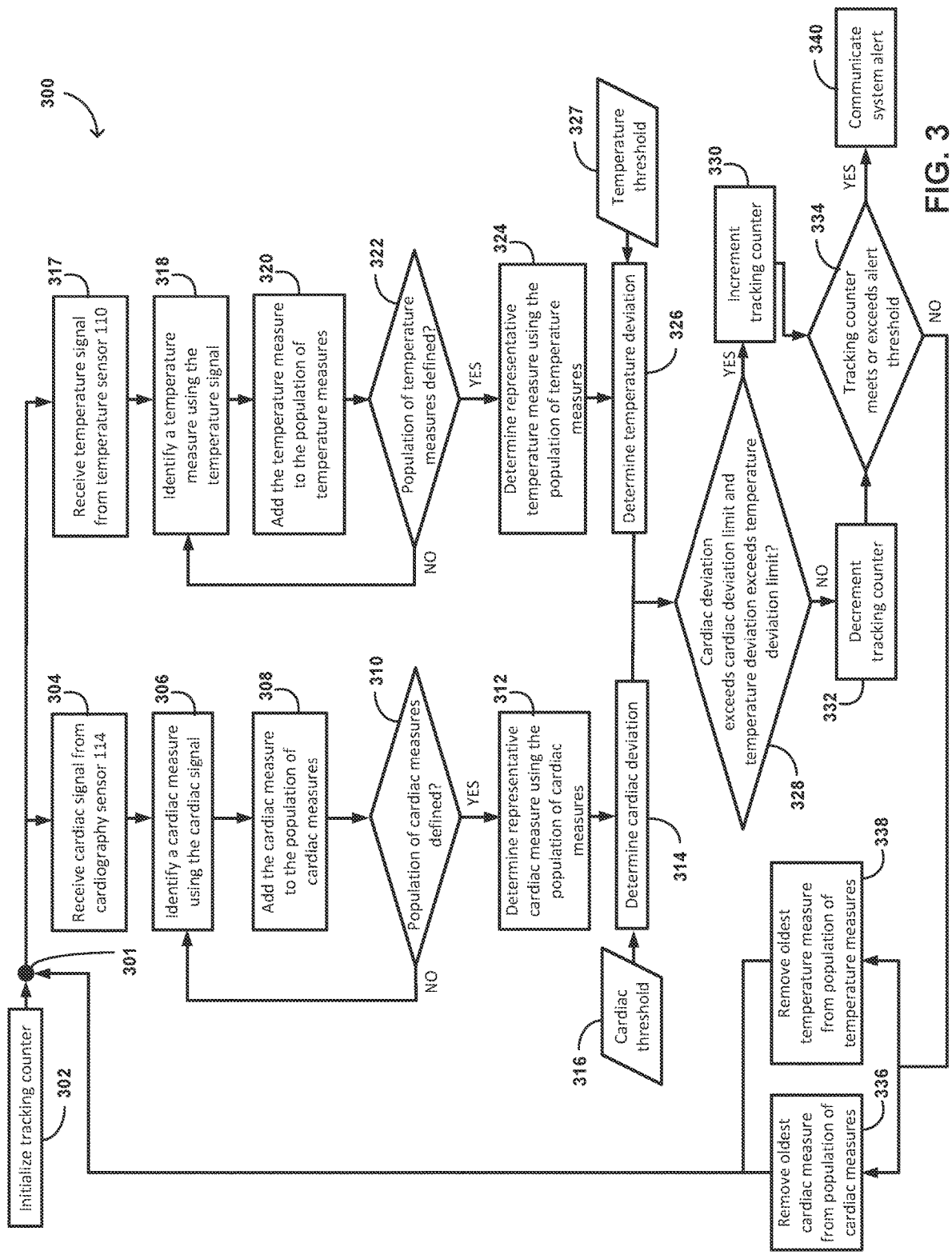
FIG. 3 is an example flow diagram for determining a representative cardiac measure and a representative temperature measure using processing circuitry of the medical system.

FIG. 2 illustrates a flow diagram of an example technique 200 which may be utilized by processing circuitry 106 to determine a cardiac threshold and a temperature threshold for patient 104 using cardiac sensor 114 and temperature sensor 110. FIG. 3 illustrates a flow diagram of an example technique 300 which may be utilized by processing circuitry 106 to determine a cardiac deviation and a temperature deviation based on the cardiac threshold and the temperature threshold determined. Processing circuitry 106 may utilize all or any portion of the technique illustrated by FIG. 2 and/or FIG. 3. Although FIG. 2 and FIG. 3 represent certain actions and/or steps are occurring in a specified order, the actions and/or steps may occur in any order including parallel and sequential orders sufficient to perform the functionality of processing circuitry 106 described.

As illustrated in FIG. 2, processing circuitry 106 may determine the cardiac threshold and the temperature threshold based on thresholding cardiac measure and temperature thresholding measures defined during a thresholding window. The thresholding window may be, for example, defined by a certain number of cardiac cycles of patient 104 (e.g., 30), defined by an elapsed time, or defined by one or more other measures and/or parameters. Processing circuitry 106 may be configured to determine a starting point and a stopping point for the thresholding window. In examples, processing circuitry is configured to use an initial cardiac cycle (e.g., a heartbeat) of patient 104 as the starting point and use a subsequent cardiac cycle of patient 104 as the stopping point. The subsequent cardiac cycle may be separated from the initial cardiac cycle by one or more intervening cardiac cycles of patient 104.

Processing circuitry 106 may determine a starting point and commence the thresholding window (202). Processing circuitry 106 may receive a cardiac signal from cardiac sensor 114 during the thresholding window (204). Processing circuitry 106 may define a set of thresholding cardiac measures during the thresholding window using the cardiac signal received (206). Processing circuitry 106 may define a thresholding cardiac measure based on the cardiac activity (e.g., a cardiac cycle) of patient 104 indicated by the cardiac signal received from cardiac sensor 114. For example, the cardiac signal may be indicative of an electrocardiogram (ECG) signal, and a thresholding cardiac measure may be based on some portion of an ECG wave segment of the ECG signal. The set of thresholding cardiac measures may be one or more thresholding cardiac measures determined using the cardiac signal. In examples, the set of thresholding cardiac measures is a plurality of thresholding cardiac measures. Processing circuitry 106 may continue to define individual thresholding cardiac measures based on the continued cardiac activity of patient 104 during the thresholding window.

Processing circuitry 106 may receive a temperature signal from temperature sensor 110 during the thresholding window (208). Processing circuitry 106 may define a set of thresholding temperature measures during the thresholding window using the temperature signal received (210). Processing circuitry 106 may define a thresholding temperature measure based on the one or more body temperatures of patient 104 indicated by the temperature signal received from temperature sensor 110. The set of thresholding temperature measures may be one or more thresholding cardiac measures determined using the cardiac signal. Processing circuitry 106 may continue to define thresholding temperature measures based on a continuing temperature signal received from temperature sensor 110 during the thresholding window. The set of thresholding temperature measures may include any quantity of temperature measures. In some examples, processing circuitry 106 determines a single thresholding temperature measure during the thresholding window.

Processing circuitry 106 may terminate the thresholding window (212). In examples, processing circuitry 106 terminates the thresholding window based on one or more physiological parameters sensed from patient 104, an elapsed time, or based on some other measure. In examples, processing circuitry 106 defines the thresholding window based on one or more cardiac cycles (e.g., heartbeats) of patient 104. Processing circuitry may define the thresholding window based on a certain number of the cardiac cycles of patient 104 (e.g., 30). In examples, processing circuitry 106 may be configured to use an initial cardiac cycle (e.g., a heartbeat) of patient 104 to define a starting point of the thresholding window (e.g., at 202) and use a subsequent cardiac cycle of patient 104 to define a stopping point of the thresholding window (e.g., at 212). The subsequent cardiac cycle may be separated from the initial cardiac cycle by one or more intervening cardiac cycles of patient 104.

Processing circuitry 106 may receive the cardiac signal (204), define the set of thresholding cardiac measures (206), receive the temperature signal (208), and/or define the set of thresholding temperature measures (210) in any order and in any sequence sufficient to define the set of thresholding cardiac measures and define the set of thresholding temperature measures. Further, processing circuitry may define one or more thresholding windows. For example, processing circuitry may define a first thresholding window and define the set of thresholding cardiac measures using the first thresholding window. Processing circuitry 106 may define a second thresholding window and define the set of thresholding temperature measures using the second thresholding window. The first thresholding window and the second thresholding window may be substantially chronologically concurrent, chronologically overlapping, or chronologically displaced from each other. The first thresholding window and the second thresholding window may be based on different measures. For example, one of the first thresholding window or the second thresholding window may be based on a physiological parameter sensed from patient 104 while the other of the first thresholding window or the second thresholding window may be based on an elapsed time or some other measure.

Processing circuitry 212 may determine a cardiac threshold for patient 104 using the set of thresholding cardiac measures defined within the thresholding window (214). As discussed, the cardiac threshold is representative of the set of thresholding cardiac measures. Processing circuitry 106 may determine the cardiac threshold using a summary statistic applied to the set of thresholding cardiac measures. In examples, processing circuitry 106 determines the cardiac threshold by defining a statistical value (e.g., an average value or another statistical value) indicative of the set of thresholding cardiac measures.

Processing circuitry 106 may determine a temperature threshold for patient 104 using the set of thresholding temperature measures defined within the thresholding window (216). As discussed, the temperature threshold is representative of the set of thresholding temperature measures. Processing circuitry 106 may determine the temperature threshold using a summary statistic applied to the set of individual thresholding temperature measures. In examples, processing circuitry 106 determines the temperature threshold by defining a statistical value (e.g., an average value or another statistical value) indicative of the set of individual thresholding temperature. In some examples, processing circuitry 106 bases the representative temperature measure on a single thresholding temperature measure within the set of individual thresholding measures.

Processing circuitry 106 may determine the cardiac threshold using the set of thresholding cardiac measures (214) and determine the temperature threshold (216) using the set of thresholding temperature measures in any order and in any sequence sufficient to determine the cardiac threshold and the temperature threshold. For example, processing circuitry 106 may define the first thresholding window and the second thresholding window, and determine the cardiac threshold following the first thresholding window and the temperature threshold following the second thresholding window.

Processing circuitry 106 may be configured to assess whether the blood of patient 104 was in a euglycemic range during the determination of the cardiac threshold and/or the temperature threshold (218). Processing circuitry 106 may be configured to receive an indication signifying that the blood of patient 104 is in the euglycemic range to accomplishment the assessment. In examples, processing circuitry 106 is configured to receive the indication from an external device (e.g., external device 121). For example, external device 121 may be configured to receive a user input from patient 104 and/or a clinician indicating that the blood of patient 104 is in a euglycemic range. External device 121 may communicate the user input to processing circuitry 106. Processing circuitry 106 may store the cardiac threshold and the temperature threshold based on a user input received indicating the blood of patient 104 was in the euglycemic range (220). In examples, processing circuitry 106 may be configured to begin a new thresholding window (e.g., at 202) and redetermine the cardiac threshold and the temperature threshold based on a user input received indicating the blood of patient 104 was not in the euglycemic range. In some examples, processing circuitry 106 is not dependent on a user input assessing the glycemic state of patient 104, and processing circuitry 106 proceeds to store the cardiac threshold and the temperature threshold without receiving a user input assessing the glycemic state of patient 104.

Further, although assessing the euglycemic state of patient 104 is represented as occurring subsequent to determining the cardiac threshold and/or temperature threshold in FIG. 2, processing circuitry 106 may receive a user input indicating the glycemic state at any point during the determination of the cardiac threshold and the temperature threshold, including prior to beginning the thresholding window, during the thresholding window, or following termination of the thresholding window.

FIG. 3 illustrates a flow diagram of example technique 300 which may be utilized by processing circuitry 106 to determine a cardiac deviation and a temperature deviation based on the cardiac threshold and the temperature threshold determined, e.g., according to example technique 200 of FIG. 2. Processing circuitry 106 may substantially track the cardiac deviation and the temperature deviation over a beat window of patient 104, and provide a system alert based on the cardiac deviation and the temperature deviation causing processing circuitry 106 to exceed an alert limit. In examples, processing circuitry 106 uses a tracking counter to monitor the cardiac deviation and the temperature deviation over the beat window.

Processing circuitry 106 may conduct portions of technique 300 in a substantially cyclic and/or repeating manner. In examples, processing circuitry 106 cyclically repeats portions of technique 300 based on the cardiac cycles (e.g., heartbeats) of patient 104. For example, processing circuitry 106 may conduct portions of technique 300 (e.g., return to node 301 and conduct portions 304 through 338) substantially each time processing circuitry 106 identifies a cardiac cycle of patient 104. Hence, processing circuitry 106 may update the representative cardiac measure and the representative temperature measure and compare against the cardiac threshold and the temperature threshold on substantially a beat-by-beat basis, such that the resulting cardiac deviation and the temperature deviation remain substantially indicative of a current state of patient 104. Over the cycles, processing circuitry 106 tracks a ratio of when the cardiac deviation and the temperature deviation both meet and/or exceed respective limits versus when either the cardiac deviation or the temperature deviation fail to meet and/or exceed the respective limit. Processing circuitry 106 issues a system alert (e.g., at 336) when the ratio exceeds an alert threshold.

Processing circuitry 106 may initialize the tracking counter (302) at the commencement of a monitoring period. In some examples, the monitoring period may be a defined period of time (e.g., a substantially nocturnal period of patient 104, or some portion of a 24 hour period) having a defined beginning and a defined end point. In some examples, the monitoring period may lack a defined end point, such that processing circuitry 106 assesses the glycemic status of the blood of patient 104 on a substantially continuous basis without regard to the passage of time. In some examples, processing circuitry commences a monitoring period based on a start indication from an external device (e.g., external device 121). For example, external device 121 may be configured to receive a user input from patient 104 and/or a clinician indicating that processing circuitry 106 should commence a monitoring period. Processing circuitry 106 may initialize the tracking counter in response to receiving the start indication. In some examples, processing circuitry 106 may initialize the tracking counter on a periodic basis (e.g., following an elapsed time), in response to an initial powering up (e.g., by a battery or other power source of medical system 100), or for other reasons.

Processing circuitry 106 may commence defining a beat window for patient 104 following initialization of the tracking counter. Processing circuitry 106 may receive a cardiac signal from cardiac sensor 114 during the beat window (304). Processing circuitry 106 may define a set of sensed cardiac measures during the beat window using the cardiac signal. In examples, processing circuitry identifies a sensed cardiac measure using the cardiac signal (306) and adds the sensed cardiac measure to the set of sensed cardiac measures (308). Processing circuitry 106 may define the sensed cardiac measure based on the cardiac activity (e.g., a cardiac cycle) of patient 104 indicated by the cardiac signal received from cardiac sensor 114. For example, the cardiac signal may be indicative of an electrocardiogram (ECG) signal, and a sensed cardiac measure may be based on some portion of an ECG wave segment of the ECG signal.

Processing circuitry 106 may be configured to assess when a set of sensed cardiac measures has been defined within a beat window (310). In examples, processing circuitry 106 defines the beat window based on the set of sensed cardiac measures. For example, processing circuitry 106 may define the beat window as a window encompassing a certain quantity of sensed cardiac measures (e.g., 30), and continue to identify individual sensed cardiac measures (306) and add the individual sensed cardiac measure to the set of sensed cardiac measures (308) until the number of sensed cardiac measures in the set at least equals the quantity. Hence, when processing circuitry 106 commences a monitoring period and processing circuitry 106 defines an initial beat window (e.g., following a reset, or on a start-up), processing circuitry 106 may assess and continue to populate the set of sensed cardiac measures until the set of sensed cardiac measures satisfies the criteria defined for the beat window (e.g., at least 30 sensed cardiac measures). In other examples, processing circuitry 106 may define the beat window based on another criteria, such as one or more physiological parameters sensed from patient 104, an elapsed time, or some other measure. In examples, processing circuitry 106 defines the beat window using the same or a similar criteria as that used to define the thresholding window, although this is not required.

Processing circuitry 106 may chronologically track the sensed cardiac measures identified when adding the sensed cardiac measure to the set of sensed cardiac measures, such that, for example, processing circuitry 106 may order the sensed cardiac measures from an oldest sensed cardiac measure identified to a newest sensed cardiac measure identified. As will be discussed, processing circuitry 106 may use a sliding beat window which is redefined substantially each time processing circuitry 106 cycles through portions of technique 300 (e.g., returns to node 301 and conducts portions 304 through 338). Processing circuitry 106 may redefine the beat window by removing one of the sensed cardiac measures (e.g., the oldest sensed cardiac measure) from the set of sensed cardiac measures before determining a representative cardiac measure for the redefined beat window.

Processing circuitry 106 determines a representative cardiac measure for patient 104 using the set of sensed cardiac measures defined within the beat window (312). As discussed, the representative cardiac measure is representative of the set of sensed cardiac measures collected during the beat window. Processing circuitry 106 may determine the representative cardiac measure using a summary statistic applied to the set of sensed cardiac measures. In examples, processing circuitry 106 determines the representative cardiac measure by defining a statistical value (e.g., an average value or another statistical value) indicative of the set of sensed cardiac measures. In some examples, processing circuitry 106 defines the representative cardiac measure using a summary statistic substantially similar to the summary statistic used to define the cardiac threshold. For example, processing circuitry 106 may define the cardiac threshold (e.g., at 214 (FIG. 2)) using a specific summary statistic, and define the representative cardiac measure using the specific summary statistic. In other examples, processing circuitry 106 may define the cardiac threshold using a first summary statistic and define the representative cardiac measure by a second summary statistic different from the first summary statistic.

Processing circuitry 106 compares the representative cardiac measure determined for the beat window and the cardiac threshold to determine a cardiac deviation (314). Processing circuitry 106 may retrieve the cardiac threshold from a memory (316) to determine the cardiac deviation. The cardiac deviation may be indicative of a departure of the representative cardiac measure from the cardiac threshold. In examples, the cardiac deviation is measure of a difference between the representative cardiac measure and the cardiac threshold. In some examples, processing circuitry 106 may determine the cardiac deviation substantially as the difference between the cardiac threshold and the representative cardiac measure expressed as a percentage of the cardiac threshold.

Processing circuitry 106 receives a temperature signal from temperature sensor 110 during the beat window (317). Processing circuitry 106 may define a set of sensed temperature measures during the beat window using the temperature signal. In examples, processing circuitry identifies a sensed temperature measure using the temperature signal (318) and adds the sensed temperature measure to the set of sensed temperature measure (320). Processing circuitry 106 may be configured to assess when a set of sensed temperature measures has been defined within the beat window (322). For example, processing circuitry 106 may define the set of sensed temperature measures as encompassing a certain quantity of sensed temperature measures (e.g., one or more), and continue to identify individual sensed temperature measures (318) and add the individual temperature to the set of sensed temperature measures (320) until the number of sensed temperature measures in the set at least equals the quantity. In some examples, processing circuitry 106 is configured to determine a single temperature measure during the beat window, and set of temperature measures includes the single temperature.

Processing circuitry 106 may chronologically track the sensed temperature measures identified when adding the sensed temperature measure to the set of sensed temperature measures. For example, processing circuitry 106 may order the sensed temperature measures from an oldest sensed temperature measure identified to a newest sensed temperature measure identified. As will be discussed, processing circuitry 106 may remove one of the sensed temperature measures (e.g., the oldest sensed temperature measure) from the set of sensed temperature measures substantially each time processing circuitry 106 cycles through portions of technique 300 (e.g., returns to node 301 and conducts portions 304 through 338).

Processing circuitry 106 determines a representative temperature measure for patient 104 using the set of sensed temperature measures defined within the beat window (324). As discussed, the representative temperature measure is representative of the set of sensed temperature measures collected during the beat window. Processing circuitry 106 may determine the representative temperature measure using a summary statistic applied to the set of sensed temperature measures. In examples, processing circuitry 106 determines the representative temperature measure by defining a statistical value (e.g., an average value or another statistical value) indicative of the set of sensed temperature measures. In some examples, processing circuity 106 defines the representative temperature measure using a summary statistic substantially similar to the summary statistic used to define the temperature threshold. For example, processing circuitry 106 may define the temperature threshold (e.g., at 216 (FIG. 2)) using a particular summary statistic, and define the temperature threshold using the particular specific summary statistic. In other examples, processing circuitry 106 may define the temperature threshold using a first summary statistic and define the representative temperature measure by a second summary statistic different from the first summary statistic.

Processing circuitry 106 compares the representative temperature measure determined for the beat window and the temperature threshold to determine a temperature deviation (326). Processing circuitry 106 may retrieve the temperature threshold from a memory (327) to determine the temperature. The temperature deviation may be indicative of a departure of the representative temperature measure from the temperature threshold. In examples, the temperature deviation is measure of a difference between the representative temperature measure and the cardiac threshold. In some examples, processing circuitry 106 may determine the temperature deviation substantially as the difference between the temperature threshold and the representative temperature measure expressed as a percentage of the temperature threshold.

Processing circuitry 106 compares the cardiac deviation to a cardiac deviation limit, and compares the temperature deviation to a temperature deviation limit (328). The cardiac deviation limit is indicative of a maximum allowable departure of the representative cardiac measure from the cardiac threshold. For example, the cardiac deviation limit may be indicative of a ratio of the difference between the representative cardiac measure and the cardiac threshold compared to the cardiac threshold (e.g., a percentage). In examples, the cardiac deviation limit is indicative of a percentage of the cardiac threshold of about 1%, about 5%, about 10%, or some other percentage. The temperature deviation limit is indicative of a maximum allowable departure of the representative temperature measure from the temperature threshold. For example, the temperature deviation limit may be indicative of a ratio of the difference between the representative temperature measure and the temperature threshold compared to the temperature threshold (e.g., a percentage). In examples, the temperature deviation limit is indicative of a percentage of the temperature threshold of about 1%, about 5%, about 10%, or some other percentage. In examples, processing circuitry 106 is configured to set the cardiac deviation limit and/or the temperature deviation limit based on a communication from an external device, such as external device 121. External device 121 may include a user interface configured to accept a user input (e.g., from a clinician) indicative of the cardiac deviation limit and/or temperature deviation limit.

Processing circuitry 106 increments (e.g., adds to a count of) the tracking counter when both the cardiac deviation meets and/or exceeds the cardiac deviation limit and the temperature deviation meets and/or exceeds the temperature deviation limit (330). Processing circuitry 106 decrements (e.g., removes a count from) the tracking counter when the cardiac deviation fails to meet and/or exceed the cardiac deviation limit or the temperature deviation fails to meet and/or exceed the temperature deviation limit (332). In examples, processing circuitry issues a positive communication (e.g., to the tracking counter) when both the cardiac deviation meets and/or exceeds the cardiac deviation limit and the temperature deviation meets and/or exceeds the temperature deviation limit, and the tracking counter increments the count based on the positive communication. In examples, processing circuitry issues a negative communication (e.g., to the tracking counter) when either the cardiac deviation fails to meet and/or exceed the cardiac deviation limit or the temperature deviation fails to meet and/or exceed the temperature deviation limit, and the tracking counter decrements the count based on the negative communication. Processing circuitry 106 may thus track the issue of positive communications relative to the issue of negative communications using the tracking counter.

Processing circuitry compares the count of the tracking counter to an alert threshold (334). If the count of the tracking counter does not meet and/or exceeds an alert threshold, processing circuitry 106 may return to node 301 to cyclically repeat the process. Processing circuitry 106 may remove the oldest sensed cardiac measure in the set of sensed cardiac measures (336), may remove the oldest sensed temperature measure from the set of sensed temperature measures (338), and redefine the beat window prior to determining a representative cardiac measure and a representative temperature measure for the redefined beat window. Thus, processing circuitry 106 may substantially weight the representative cardiac measure and the representative temperature measure toward more recent cardiac measures and the temperature measures, such that representative cardiac measure and the representative temperature measure more closely align with a current glycemic state of the patient.

If the count of the tracking counter does meet and/or exceed the alert threshold, processing circuitry 106 issues a system alert (340). Processing circuitry 106 may communicate the system alert to external device 121. External device 121 may generate an output observable by patient 104 (e.g., a visual, audible, tactile, or some other alert perceivable by patient 104) to communicate the system alert to patient 104. In examples, external device 121 generates an output observable by a clinician. For example, external device 121 may be a server and one or more processors configured to generate the output for the clinician. Processing circuitry 106 may continue to redefine the beat window and perform steps necessary for comparison to the cardiac limit and the temperature limit subsequent to an alert. In examples, processing circuitry 106 may re-initialize the tracking counter following an alert.

Hence, the processing circuitry 106 may be configured to assess a current glycemic state of patient 104 using a representative cardiac measure and a representative temperature measure determined over a beat window for patient 104. Processing circuitry 106 may periodically redefine the beat window and update the representative cardiac measure and the representative temperature measure. Processing circuitry 106 determines the cardiac deviation and the temperature deviation in a repeating process based on updates to the beat window, such that medical system may evaluate the glycemic state of the patient on a relatively continuous basis. Processing circuitry 106 may utilize the tracking counter to substantially weight system alerts toward more recent sensed cardiac measures and the temperature measures, such that system alerts issued more closely align with the current glycemic state of the patient.

Figure 4:
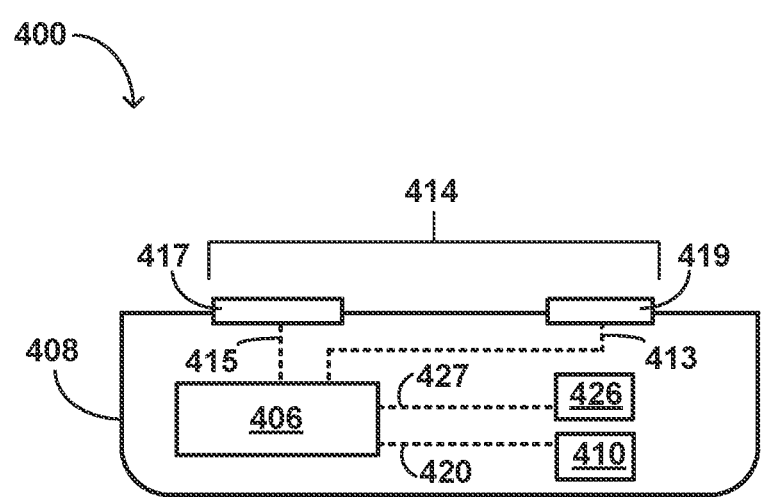
FIG. 4 is a conceptual diagram of a medical system including processing circuitry, a cardiac sensor, and a temperature sensor.

In examples, device housing 108 of medical system 100 mechanically supports one or more of processing circuitry 106, cardiac sensor 114, and/or temperature sensor 110. For example, FIG. 4 illustrates an example medical system 400 including a housing 408. Medical system 400 is an example of medical system 100. Device housing 408 mechanically supports processing circuitry 406, cardiac sensor 414, and temperature sensor 410. Cardiac system 414 may include electrode 417 and/or electrode 419. Housing 408 may be configured as a wearable, implantable, and/or portable device configured to contact a body (e.g., a torso) of patient 104 (FIG. 1). Electrodes 417, 419 may be configured to communicate a cardiac characteristic to processing circuitry 406 via, e.g., a communication link 415 and/or a communication link 413. Temperature sensor 410 may be configured to communicate a temperature signal representative of a body temperature of patient 104 to processing circuitry 406 via, e.g., a communication link 420. Device housing 408, processing circuitry 406, cardiac sensor 414, and temperature sensor 410 are examples of device housing 108, processing circuitry 106, cardiac sensor 114, and temperature sensor 110 respectively.

In examples, housing 408 may mechanically support communication circuitry 426 configured to communicate with (e.g., send communications to and/or receive communications from) external device 121 (FIG. 1). Communication circuitry 426 may be configured to send communications received from external device 121 to processing circuitry 406. Communication circuitry 426 may be configured to send communications received from processing circuitry 406 to external device 121. In examples, communication circuitry 426 is configured to communication with processing circuitry via communication link 427. In examples, medical system 400 may take the general form of a Reveal LINQ Insertable Cardiac Monitor available from Medtronic, Inc. of Minneapolis, Minnesota.

As discussed, processing circuitry 106, 406 may be configured to identify one or more cardiac measures (e.g., thresholding cardiac measure and/or sensed cardiac measures) using the cardiac signal received from cardiac sensor 114, 414. Processing circuitry may be configured to identify variabilities in the one or more cardiac measures. In examples, a cardiac measure identified by processing circuitry 106, 406 using the cardiac signal is indicative of changes in autonomic status of heart 102, such as heart rate variability, acceleration, and deceleration capacity and/or heart rate turbulence. A cardiac measure may be indicative of an arrhythmia of heart 102. In examples, a cardiac measure may be selected to reflect changes in the sympathetic and/or parasympathetic drive of heart 102, such as an increased sympathetic drive and/or a decreased parasympathetic drive. In some examples, a cardiac measure is indicative of a low frequency band of heart rate variability and/or of an acceleration capacity (e.g., to reflect the sympathetic drive of heart 102). In some examples, a cardiac measure is indicative of a high frequency band of heart rate variability and/or of a deceleration capacity (e.g., to reflect the parasympathetic drive of heart 102).

In examples, a cardiac measure identified by processing circuitry 106, 406 using the cardiac signal is indicative of a cardiomyopathy. The cardiomyopathy may be characterized by, for example, a left ventricular hypertrophy, and/or other physiological characteristics of heart 102. In examples, a cardiac measure is at least one of a heart rate variability (HRV), a QT internal variability (QTV), a corrected QT interval (QTc and/or QTt), a QRST integral, an ST interval, an ST elevation, a T wave amplitude, a T-peak to T-end interval, a T slope, a T-wave area, a T-wave asymmetry, an R-wave amplitude, a T-wave amplitude, an R-wave/T-wave amplitude, and/or another identifiable physiological characteristic of the cardiac signal of patient 104. A cardiac measure identified may include a T-wave alternans based on two or more T-waves (e.g., by beat-to-beat envelop analyses). In some examples, a cardiac measure identified by processing circuitry 106, 406 using the cardiac signal includes a T-wave area variability including the dimensions of start ending, height slope, and/or symmetry.

Figure 5:
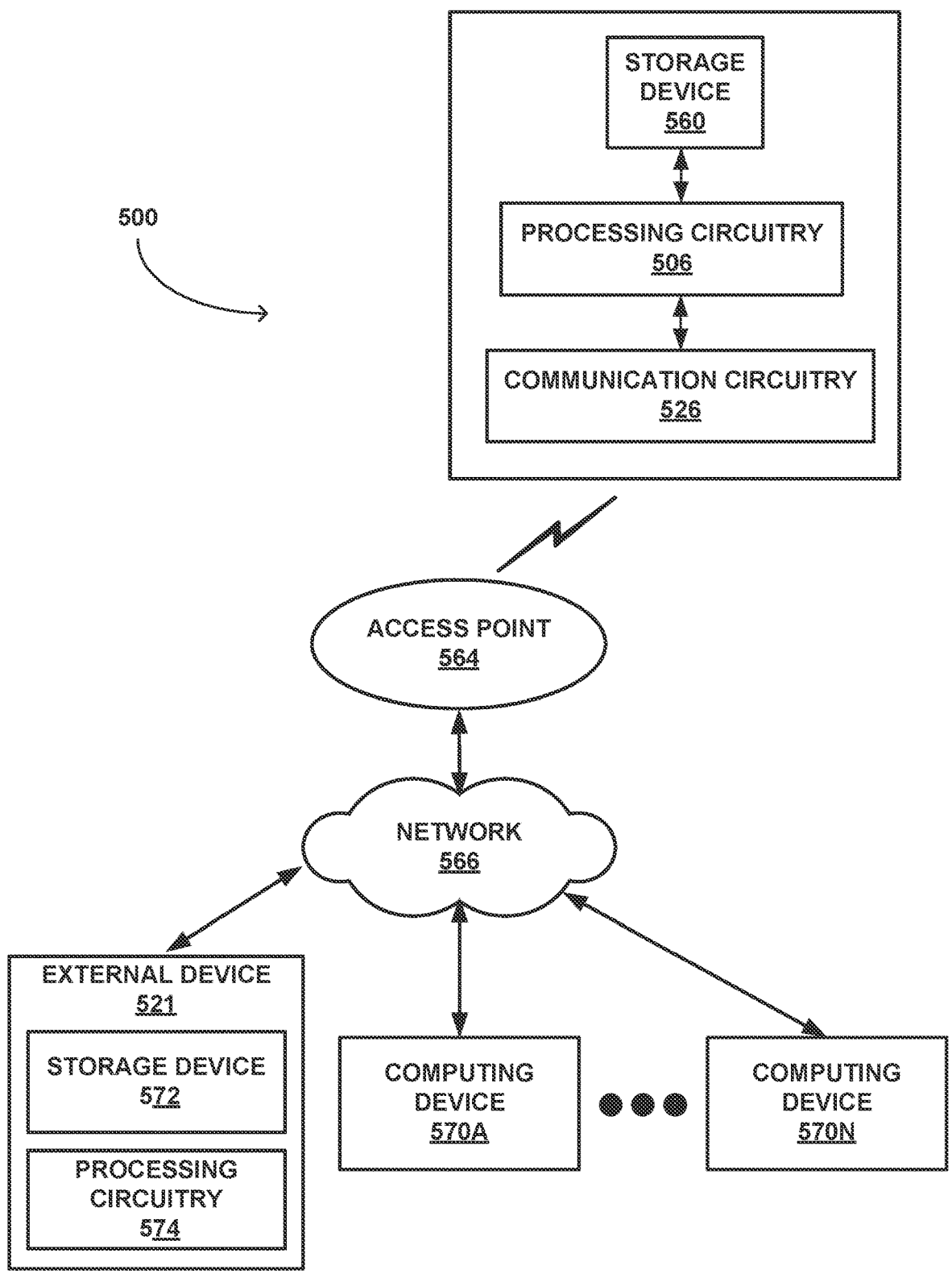
FIG. 5 is a conceptual diagram of a medical system including a network.

FIG. 5 is a block diagram illustrating an example medical system 500 configured to communicate with an external device 521. Medical system 500 includes processing circuitry 506, communication circuitry 526, and storage device 560. Medical system 500 is an example of medical system 100, 400 and processing circuitry 506 is an example of processing circuitry 106, 406. Processing circuitry 506 may include one or more processors that are configured to implement functionality and/or process instructions for execution within medical system 500. For example, processing circuitry 506 may be capable of processing instructions stored in storage device 560. Processing circuitry 506 may include, for example, microprocessors, DSPs, ASICs, FPGAs, or equivalent discrete or integrated logic circuitry, or a combination of any of the foregoing devices or circuitry. Accordingly, processing circuitry 506 may include any suitable structure, whether in hardware, software, firmware, or any combination thereof, to perform the functions ascribed herein to processing circuitry 506.

Communication circuitry 526 may include any suitable hardware, firmware, software or any combination thereof for communicating within medical system 500 or with another device and/or system external to medical system 500. Communication circuitry 526 may be configured to receive and/or send communications under the control of processing circuitry 506. In examples, communication circuitry 526 is configured to send and receive communications via communication link 115, 120, 413, 415, 420, 426, 427, and other communication links within medical system 500. In examples, communication circuitry 526 is configured to send communications to and/or receive communications, including downlink and uplink telemetry, from devices and/or system external to medical system 500. Communication circuitry 526 may be configured to transmit or receive signals via inductive coupling, electromagnetic coupling, Near Field Communication (NFC), Radio Frequency (RF) communication, Bluetooth, Wi-Fi, or other proprietary or non-proprietary wireless communication schemes. Communication circuitry 526 may be configured to communicate via any of a variety of forms of wired and/or wireless communication and/or network protocols.

Storage device 560 may be configured to store information within medical system 500 during operation. Storage device 560 may include a computer-readable storage medium or computer-readable storage device. In some examples, storage device 560 includes one or more of a short-term memory or a long-term memory. Storage device 560 may include, for example, RAM, DRAM, SRAM, magnetic discs, optical discs, flash memories, or forms of EPROM or EEPROM. Storage device 560 may be used to store at least a portion of the cardiac signal generated by cardiac sensor 114, 414 and/or the temperature signal generated by temperature sensor 110, 410. In examples, storage device 560 is used to store data indicative of instructions for execution by processing circuitry 506. Storage device 560 may be used by software or applications running within medical system 500 to temporarily store information during program execution.

Medical system 500 may be configured to configured to couple to a network 566 (e.g., via an access point 564) in accordance with one or more techniques described herein. For example, medical system 500 may use communication circuitry 526 to communicate with access point 564 via a hard-line or wireless connection. In examples, medical system 500, access point 564, an external device 521, and/or one or more computing devices 570A-570N may be interconnected and may communicate with each other through network 566. Access point 564 may include a device that connects to network 566 via any of a variety of connections, such as telephone dial-up, digital subscriber line (DSL), or cable modem connections. In other examples, access point 564 may be coupled to network 566 through different forms of connections, including wired or wireless connections.

External device 521 may include a server. The server may be configured to provide a secure storage site for data that has been collected by medical system 500. In some cases, the server may assemble data in web pages or other documents for viewing by trained professionals, such as clinicians, via computing devices 570A-570N. In examples, external device 521 may comprise one or more servers, a cloud, one or more databases, and/or a data center. External device 521 may include a storage device 572 (e.g., a memory device) to, for example, store data retrieved from medical system 500. Server 568 may include processing circuitry 574 including one or more processors that are configured to implement functionality and/or process instructions for execution within external device 521. For example, processing circuitry 574 may be capable of processing instructions stored in storage device 572. Processing circuitry 574 may include, for example, microprocessors, DSPs, ASICs, FPGAs, or equivalent discrete or integrated logic circuitry, or a combination of any of the foregoing devices or circuitry. Storage device 572 may include a computer-readable storage medium or computer-readable storage device. In some examples, storage device 572 includes one or more of a short-term memory or a long-term memory, such as RAM, DRAM, SRAM, magnetic discs, optical discs, flash memories, or forms of EPROM or EEPROM.

In examples, processing circuitry 574 includes or is a portion of processing circuitry 506. Processing circuitry 574 may be configured to perform all of some portion of the functionality described with respect to processing circuitry 506. Medical system 500 may be configured to provide data to server 568 to enable processing circuitry 574 to perform any portion of the functionality described with respect to processing circuitry 506.

Figure 6:
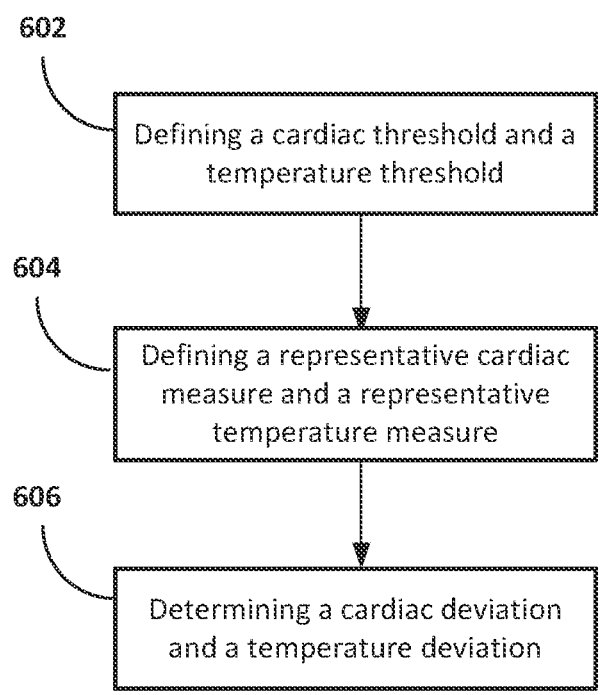
FIG. 6 illustrates an example technique for using a medical system to assess a glycemic state of a patient.

A technique for determining a representative glucose level of a patient is illustrated in FIG. 6. Although the technique is described mainly with reference to medical system 100, 400, 500 of FIGS. 1, 4 and 5, technique 200 of FIG. 2, and technique 300 of FIG. 3, the technique may be applied to other medical systems in other examples.

The technique includes defining, using processing circuitry 106, 406, 506, a cardiac threshold and a temperature threshold for a patient 104 (602). The cardiac threshold may be indicative of an electrical activity of a heart 102 of patient 104 when patient 104 is in a euglycemic range. The temperature threshold may be indicative of a body temperature of patient 104 when patient 104 is in the euglycemic range.

Processing circuitry 106, 406, 506 may receive a cardiac signal from cardiac sensor 114, 414 and determines the cardiac threshold using the cardiac signal. Processing circuitry 106, 406, 506 may define a set of thresholding cardiac measures using the cardiac signal and determine the cardiac threshold based on the set of thresholding cardiac measures. In examples, processing circuitry 106, 406, 506 defines a thresholding window and defines the set of thresholding cardiac measures over the thresholding window. In examples, processing circuitry 106, 406, 506 determines the cardiac threshold using a summary statistic to define a statistical value describing the set of thresholding cardiac measures.

Processing circuitry 106, 406, 506 may receive a temperature signal from temperature sensor 110, 410 and determine the temperature threshold using the temperature signal. Processing circuitry 106, 406, 506 may define a set of thresholding temperature measures using the temperature signal and determine the temperature threshold based on the set of thresholding temperature measures. In examples, processing circuitry 106, 406, 506 defines the set of thresholding temperature measures over the thresholding window. In examples, processing circuitry 106, 406, 506 determines the temperature threshold using a summary statistic to define a statistical value describing the set of thresholding temperature measures.

The technique includes defining, using processing circuitry 106, 406, 506, a representative cardiac measure and a representative temperature measure for patient 104 (604). The representative cardiac measure may be indicative of the ongoing electrical activity of heart 102 of patient 104. The representative temperature measure may be indicative of an ongoing body temperature of patient 104.

Processing circuitry 106, 406, 506 may receive the cardiac signal from cardiac sensor 114, 414 and determines the representative cardiac measure using the cardiac signal. Processing circuitry 106, 406, 506 may define a set of sensed cardiac measures using the cardiac signal and determine the representative cardiac measure based on the set of sensed cardiac measures. In examples, processing circuitry 106, 406, 506 defines a beat window and defines the set of sensed cardiac measures over the beat window. In examples, processing circuitry 106, 406, 506 determines the representative cardiac measure using a summary statistic to define a statistical value describing the set of sensed cardiac measures.

Processing circuitry 106, 406, 506 may receive temperature signal from temperature sensor 110, 410 and determine the representative temperature measure using the temperature signal. Processing circuitry 106, 406, 506 may define a set of sensed temperature measures using the temperature signal and determine the representative temperature measure based on the set of sensed temperature measures. In examples, processing circuitry 106, 406, 506 defines the set of sensed temperature measures over the beat window. In examples, processing circuitry 106, 406, 506 determines the representative temperature measure using a summary statistic to define a statistical value describing the set of sensed temperature measures.

The technique includes determining, using processing circuitry 106, 406, 506, a cardiac deviation and a temperature deviation (606). The cardiac deviation may be indicative of a departure of the representative cardiac measure from the cardiac threshold. The temperature deviation may be indicative of a departure of the representative temperature measure from the temperature threshold. Processing circuitry 106, 406, 506 may compare the cardiac deviation to a cardiac deviation limit and compare the temperature deviation to a temperature deviation limit. Processing circuitry 106, 406, 506 may generate a positive communication when both the cardiac deviation meets or exceeds the cardiac deviation limit and the temperature deviation meets or exceeds the temperature deviation limit. In examples, processing circuitry 106, 406, 506 generates a negative communication when either the cardiac deviation fails to meet or exceed the cardiac deviation limit or the temperature deviation fails to meet or exceed the temperature deviation limit.

Processing circuitry 106, 406, 506 may periodically update the representative cardiac measure and the representative temperature measure based on additional parameters sensed from patient 104. Processing circuitry 106, 406, 506 may define a sliding beat window and update the representative cardiac measure and/or the representative temperature measure when the sliding beat window is altered. Processing circuitry 106, 406, 506 may determine a cardiac deviation and a temperature deviation for the redefined beat window, and issue a positive communication or a negative communication for the redefined beat window based on the determinations. Processing circuitry 106, 406, 506 may periodically redefine the beat window and issue positive or negative communications over a defined period (e.g., over a substantially nocturnal period of patient 104, or substantially continuously over a 24 hour period).

Processing circuitry 106, 406, 506 may track at least the positive communications and issue a system alert based on the tracked positive communications issued. Processing circuitry 106, 406, 506 may track the issue of positive communications relative to the issue of negative communications and issue the system alert based on the issue of positive communications relative to the issue of negative communications. In examples, processing circuitry 106, 406, 506 increments a tracking counter when a positive communication is issued and decrements the tracking counter when a negative communication is issued. Processing circuitry 106, 406, 506 may issue a system alert when the tracking counter exceeds an alert threshold (e.g., 60).

In examples, processing circuitry 106, 406, 506 communicates the system alert to external device 121. External device 121 may generate an output observable by patient 104 and/or a clinician (e.g., a visual, audible, tactile, or some other alert perceivable by patient 104 and/or the clinician) to communicate the system alert to patient 104 and/or the clinician.

The disclosure includes the following examples.

Example 1: A medical system comprising: a memory; and processing circuitry operably connected to the memory, wherein the processing circuitry is configured to: define a cardiac threshold for a patient, wherein the cardiac threshold is indicative of an electrical activity of a heart of the patient when the patient is in a euglycemic range, define a temperature threshold for the patient, wherein the temperature threshold is indicative of a body temperature of the patient when the patient is in the euglycemic range, store the cardiac threshold and the temperature threshold using the memory, receive a cardiac signal indicative of the electrical activity of the heart of the patient and a temperature signal indicative of a body temperature of the patient, and assess a glycemic state of the patient by: retrieving the cardiac threshold and the temperature threshold from the memory, determining a representative cardiac measure using the cardiac signal, comparing the representative cardiac measure and the cardiac threshold to determine a cardiac deviation, determining a representative temperature measure using the temperature signal, comparing the representative temperature measure and the temperature threshold to determine a temperature deviation, and generating a positive communication when the cardiac deviation meets or exceeds a cardiac deviation limit and the temperature deviation meets or exceeds a temperature deviation limit.

Example 2: The medical system of example 1 further comprising a cardiac sensor configured to sense the cardiac signal of the patient, wherein the cardiac sensor is configured to communicate the cardiac signal to the processing circuitry.

Example 3: The medical system of example 1 or example 2, further comprising a temperature sensor configured to sense the temperature signal of the patient, wherein the temperature sensor is configured to communicate the temperature signal to the processing circuitry.

Example 4: The medical system of any of examples 1-3, wherein the processing circuitry is configured to determine one or more cardiac measures using the cardiac signal.

Example 5: The medical system of any of examples 1-4, wherein the processing circuitry is configured to determine one or more temperature measures using the temperature signal, and wherein the processing circuitry is configured to determine the representative temperature measure using the one or more temperature measures.

Example 6: The medical system of any of examples 1-5, wherein the processing circuitry is configured to define a set of thresholding cardiac measures using the cardiac signal, and wherein the processing circuitry is configured to determine the cardiac threshold using the set of thresholding cardiac measures.

Example 7: The medical system of example 6, wherein the processing circuitry is configured to determine the cardiac threshold using a summary statistic to define a statistical value describing the set of thresholding cardiac measures.

Example 8: The medical system any of examples 1-7, wherein the processing circuitry is configured to define a set of sensed cardiac measures using the cardiac signal, and wherein the representative cardiac measure is determined based on the set of sensed cardiac measures.

Example 9: The medical system of example 8, wherein the processing circuitry is configured to determine the representative cardiac threshold using a summary statistic to define a statistical value describing the set of sensed cardiac measures.

Example 10: The medical system of any of examples 1-9, wherein the processing circuitry is configured to define a set of thresholding temperature measures using the temperature signal, and wherein the temperature threshold is determined based on the set of thresholding temperature measures.

Example 11: The medical system of example 10, wherein the processing circuitry is configured to determine the temperature threshold using a summary statistic to define a statistical value describing the set of thresholding temperature measures.

Example 12: The medical system any of examples 1-11, wherein the processing circuitry is configured to define a set of sensed temperature measures using the temperature signal, and wherein the representative temperature measure is determined based on the set of sensed temperature measures.

Example 13: The medical system of example 12, wherein the processing circuitry is configured to determine the temperature threshold using a summary statistic to define a statistical value describing the set of sensed temperature measures.

Example 14: The medical system of any of examples 1-13, wherein the processing circuitry is configured to define a set of thresholding cardiac measures over a thresholding window using a cardiac sensor, wherein the processing circuitry is configured to define a set of sensed cardiac measures over a beat window using the cardiac sensor, and wherein the thresholding window chronologically precedes the beat window.

Example 15: The medical system of any of examples 1-14, wherein the processing circuitry is configured to define a set of thresholding temperature measures over a thresholding window using a temperature sensor, wherein the processing circuitry is configured to define a set of sensed temperature measures over a beat window using the temperature sensor, and wherein the thresholding window chronologically precedes the beat window.

Example 16: The medical system of any of examples 1-15, wherein the processing circuitry is configured to issue a system alert based at least on generating one or more positive communications.

Example 17: The medical system of any of examples 1-16, wherein the processing circuitry is configured to increment a count of a tracking counter when the processing circuitry generates the positive communication, and wherein the processing circuitry is configured to issue a system alert based at least on the count of the tracking counter.

Example 18: The medical system of any of examples 1-17, wherein the processing circuitry is configured to generate a negative communication when either the cardiac deviation fails to meet or exceed the cardiac deviation limit or the temperature deviation fails to meet or exceed the temperature deviation limit.

Example 19: The medical system of examples 18, wherein the processing circuitry is configured to issue a system alert based at least on generating one or more negative communications.

Example 20: The medical system of example 18 or example 19, wherein the processing circuitry is configured to decrement a count of a tracking counter when the processing circuitry generates the negative communication, and wherein the processing circuitry is configured to issue a system alert based at least on the count of the tracking counter.

Example 21: The medical system of any of examples 1-20, wherein the cardiac signal is indicative of one or more parameters of at least one of a P-wave, a Q-wave, and R-wave, an S-wave, or a T-wave, and where the representative cardiac measure is a summary statistic of the one or more parameters.

Example 22: The medical system of example 21, wherein the one or more parameters includes an R-T amplitude ratio.

Example 23: The medical system of example 21 or 22, wherein the processing circuitry is configured to define a set of thresholding cardiac measures over a thresholding window using the cardiac signal, wherein the processing circuitry is configured to define a set of sensed cardiac measures over a beat window using the cardiac signal, and wherein the set of thresholding cardiac measures and the set of sensed cardiac measures are based on the one or more parameters.

Example 24: The medical system of any of examples 1-23, wherein the processing circuitry is configured to: define a set of sensed cardiac measures using the cardiac signal over a beat window, wherein the set of sensed cardiac measures includes one or more cardiac measures, redefine the beat window by defining a new sensed cardiac measure using the cardiac signal, update the set of sensed cardiac measures by replacing at least one of the one of more cardiac measures with the new sensed cardiac measure, and determine the representative cardiac measure using the updated set of sensed cardiac measures.

Example 25: The medical system of example 24, wherein the one or more cardiac measures includes a chronologically oldest cardiac measure, and wherein the at least one of the one of more cardiac measures includes the chronologically oldest cardiac measure.

Example 26: The medical system of any of examples 1-25, wherein the processing circuitry is configured to: define a set of sensed temperature measures using the temperature signal over a beat window, wherein the set of sensed temperature measures includes one or more temperature measures, define a new sensed temperature measure during a redefined beat window using the temperature signal, update the set of sensed temperature measures by replacing at least one of the one or more temperature measures with the new sensed temperature measure, and determine the representative temperature measure using the updated set of sensed temperature measures.

Example 27: The medical system of example 26, wherein the at least one of the one of more temperature measures includes the chronologically oldest temperature measure.

Example 28: The medical system of any of examples 1-27, wherein the processing circuitry is configured to: determine a Q-T interval based on the cardiac signal; and designate, based on the Q-T interval, a status of the patient as hypoglycemic or hyperglycemic when the processing system issues a system alert.

Example 29: The medical system of any of examples 1-28, further comprising: an electrode configured to sense the cardiac signal; and a temperature sensor configured to sense the temperature signal, wherein the processing circuitry is configured to receive the cardiac signal from the electrode, and wherein the processing circuitry is configured to receive the temperature signal from the temperature sensor.

Example 30: The medical system of any of examples 1-29, further comprising an implantable device configured to be implanted within the patient, wherein the implantable device mechanically supports the processing circuitry.

Example 31: The medical system of example 30, wherein the cardiac sensor includes an electrode, and wherein the electrode is mechanically supported by the implantable device.

Example 32: The medical system of example 30 or example 31, wherein the temperature sensor is mechanically supported by the implantable device.

Example 33: The medical system of any of examples 1-32, further comprising an external device, wherein the processing circuitry configured to communicate a system alert to the external device, and wherein a user interface of the external device is configured to provide a patient alert based on the system alert, wherein the patient alert is observable by at least one of the patient or a clinician.

Example 34: A method, comprising: defining, using processing circuitry, a cardiac threshold for a patient, wherein the cardiac threshold is indicative of an electrical activity of a heart of the patient when the patient is in a euglycemic range, defining, using the processing circuitry, a temperature threshold for the patient, wherein the temperature threshold is indicative of a body temperature of the patient when the patient is in the euglycemic range, receiving, using the processing circuitry, a cardiac signal indicative of the electrical activity of the heart of the patient and a temperature signal indicative of a body temperature of the patient, storing, using the processing circuitry, the cardiac threshold and the temperature threshold in a memory, and assessing a glycemic state of the patient by using the processing circuitry to: retrieve the cardiac threshold and the temperature threshold from the memory, determine a representative cardiac measure using the cardiac signal, compare the representative cardiac measure and the cardiac threshold to determine a cardiac deviation, determine a representative temperature measure using the temperature signal, compare the representative temperature measure and the temperature threshold to determine a temperature deviation, and generate a positive communication when the cardiac deviation meets or exceeds a cardiac deviation limit and the temperature deviation exceeds or exceeds a temperature deviation limit.

Example 35: The method of example 34, further comprising sensing the cardiac signal using a cardiac sensor, and communicating, using the cardiac sensor, the cardiac signal to the processing circuitry.

Example 36: The method of example 35 or example 36, further comprising sensing the temperature signal using a temperature sensor, and communicating, using the temperature sensor, the temperature signal to the processing circuitry.

Example 37: The method of any of examples 35-37, further comprising: defining, using the processing circuitry, a set of thresholding cardiac measures using the cardiac signal, and determining, using the processing circuitry, the cardiac threshold based on the set of thresholding cardiac measures.

Example 38: The method of any of examples 35-37, further comprising: defining, using the processing circuitry, a set of sensed cardiac measures using the cardiac signal, and determining, using the processing circuitry, the representative cardiac measure based on the set of sensed cardiac measures.

Example 39: The method of any of examples 35-38, further comprising: defining, using the processing circuitry, a set of thresholding temperature measures using the temperature signal, and determining, using the processing circuitry, the temperature threshold based on the set of thresholding temperature measures.

Example 40: The method of any of examples 35-39, further comprising: defining, using the processing circuitry, a set of sensed temperature measures using the temperature signal, and determining, using the processing circuitry, the representative temperature measure based on the set of sensed temperature measures.

Example 41: The method of any of examples 35-40, further comprising: defining, using the processing circuitry, a set of thresholding cardiac measures over a thresholding window using a cardiac sensor, and defining, using the processing circuitry, a set of sensed cardiac measures over a beat window using the cardiac sensor, wherein the thresholding window chronologically precedes the beat window.

Example 42: The method of any of examples 35-41, further comprising: defining, using the processing circuitry, a set of thresholding temperature measures over a thresholding window using a temperature sensor, defining, using the processing circuitry, a set of sensed temperature measures over a beat window using the temperature sensor, wherein the thresholding window chronologically precedes the beat window.

Example 43: The method of any of examples 35-42, further comprising issuing, by the processing circuitry, a system alert based at least on generating one or more positive communications.

Example 44: The method of any of examples 35-43, further comprising generating, using the processing circuitry, a negative communication when either the cardiac deviation fails to meet or exceed the cardiac deviation limit or the temperature deviation fails to meet or exceed the temperature deviation limit.

Example 45: The method of example 44, further comprising: incrementing, using the processing circuitry, a count of a tracking counter when the processing circuitry generates the positive communication; decrementing, using the processing circuitry, the count of the tracking counter when the processing circuitry generates the negative communication; and issuing, by the processing circuitry, a system alert when the count of the tracking counter exceeds an alert threshold.

Example 46: The method of any of examples 35-45, further comprising: defining, using the processing circuitry, a set of sensed cardiac measures using the cardiac signal over a beat window, wherein the set of sensed cardiac measures includes one or more cardiac measures, redefining, using the processing circuitry, the beat window by defining a new sensed cardiac measure using the cardiac signal, updating, using the processing circuitry, the set of sensed cardiac measures by replacing at least one of the one of more cardiac measures with the new sensed cardiac measure, and determining, using the processing circuitry, the representative cardiac measure using the updated set of sensed cardiac measures.

Example 47: The medical system of any of examples 35-46, further comprising: defining, using the processing circuitry, a set of sensed temperature measures using the temperature signal over a beat window, wherein the set of sensed temperature measures includes one or more temperature measures, defining, using the processing circuitry, a new sensed temperature measure during a redefined beat window using the temperature signal, updating, using the processing circuitry, the set of sensed temperature measures by replacing at least one of the one of more temperature measures with the new sensed temperature measure, and determining, using the processing circuitry, the representative temperature measure using the updated set of sensed temperature measures.

Example 48: The method of any of examples 35-47, further comprising: mechanically supporting the processing circuitry with a device housing; mechanically supporting an electrode with the device housing, wherein the electrode is configured to sense the cardiac signal; and mechanically supporting a temperature with the device housing, wherein the temperature sensor configured to sense the temperature signal.

Example 49: The method of any of examples 35-48, further comprising: communicating, using the processing circuitry, a system alert to an external device, and providing, using a user interface of the external device, a patient alert based on the system alert, wherein the patient alert is observable by at least one of the patient or a clinician.

Example 50: A non-transitory computer-readable storage medium comprising instructions that, when executed by processing circuitry, cause the processing circuitry to perform the method of any of examples 35-49.

Various examples of the disclosure have been described. Any combination of the described systems, operations, or functions is contemplated. These and other examples are within the scope of the following claims.

What is claimed is:

1. A medical system comprising:
   a housing configured to contact a body of a patient;
   an electrode supported by the housing, the electrode configured to sense a cardiac signal indicative of an electrical activity of a heart of the patient;
   a temperature sensor configured to sense a temperature signal indicative of a body temperature of the patient;
   a memory; and
   processing circuitry supported by the housing and operably connected to the memory, wherein the processing circuitry is configured to:
      define a cardiac threshold for the patient, wherein the cardiac threshold is indicative of the electrical activity of the heart when the patient is in a euglycemic range,
      define a temperature threshold for the patient, wherein the temperature threshold is indicative of the body temperature when the patient is in the euglycemic range,
      store the cardiac threshold and the temperature threshold using the memory,
      receive the cardiac signal via the electrode and receive the temperature signal via the temperature sensor, and
      assess a glycemic state of the patient by:
         retrieving the cardiac threshold and the temperature threshold from the memory,
         determining a representative cardiac measure using the cardiac signal,
         comparing the representative cardiac measure and the cardiac threshold to determine a cardiac deviation,
         determining a representative temperature measure using the temperature signal,
         comparing the representative temperature measure and the temperature threshold to determine a temperature deviation, and
         generating a communication indicative of the glycemic state only when the cardiac deviation meets or exceeds a cardiac deviation limit and also the temperature deviation meets or exceeds a temperature deviation limit.

2. The medical system of claim 1, wherein the temperature sensor is supported by the housing.

3. The medical system of claim 1, wherein the processing circuitry is configured to determine one or more cardiac measures using the cardiac signal, and wherein the processing circuitry is configured to determine the representative cardiac measure using the one or more cardiac measures.

4. The medical system of claim 1, wherein the processing circuitry is configured to determine one or more temperature measures using the temperature signal, and wherein the processing circuitry is configured to determine the representative temperature measure using the one or more temperature measures.

5. The medical system of claim 1, wherein the processing circuitry is configured to define a set of thresholding cardiac measures using the cardiac signal, and wherein the processing circuitry is configured to determine the cardiac threshold using the set of thresholding cardiac measures.

6. The medical system of claim 1, wherein the processing circuitry is configured to define a set of thresholding temperature measures using the temperature signal, and wherein the temperature threshold is determined based on the set of thresholding temperature measures.

7. The medical system of claim 1, wherein the processing circuitry is configured to:
   define a set of thresholding cardiac measures comprising a set of cardiac signals received over a thresholding window, and determine the cardiac threshold using the set of thresholding cardiac measures; and
   define a set of sensed cardiac measures comprising a set of cardiac signals received over a beat window, and determine the representative cardiac measure using the set of sensed cardiac measures, wherein the thresholding window chronologically precedes the beat window.

8. The medical system of claim 7, wherein the processing circuitry is configured to:
define a redefined beat window by defining a new sensed cardiac measure using the cardiac signal,
update the set of sensed cardiac measures by replacing at least one of a cardiac signal of the set of cardiac signals received over the beat window with the new sensed cardiac measure, wherein the at least one of the cardiac signal of the set of cardiac signals received over the beat window chronologically precedes the new sensed cardiac measure, and
determine the representative cardiac measure using the updated set of sensed cardiac measures.

9. The medical system of claim 8, wherein the processing circuitry is configured to:
define a new sensed temperature measure during the redefined beat window using the temperature signal, and
determine the representative temperature measure using the new sensed temperature measure.

10. The medical system of claim 1, wherein the processing circuitry is configured to:
define a set of thresholding temperature measures comprising a set of temperature signals received over a thresholding window, and determine the temperature threshold using the set of thresholding temperature measures; and
define a set of sensed temperature measures comprising a set of temperature signals received over a beat window, and determine the representative temperature measure using the set of sensed temperature measures, and wherein the thresholding window chronologically precedes the beat window.

11. The medical system of claim 1, wherein the processing circuitry is configured to increment a count of a tracking counter when the processing circuitry generates the communication, wherein the processing circuitry is configured to issue a system alert indicative of the glycemic state of the patient when the count of the tracking counter exceeds an alert threshold.

12. The medical system of claim 11,
wherein the processing circuitry is configured to generate a second communication when either the cardiac deviation fails to meet or exceed the cardiac deviation limit or the temperature deviation fails to meet or exceed the temperature deviation limit, and
wherein the processing circuitry is configured to decrement the count of the tracking counter when the processing circuitry generates the second communication.

13. The medical system of claim 12, wherein the medical system is configured to generate an output viewable by the patient in response to the system alert.

14. The medical system of claim 1, wherein the cardiac signal is indicative of one or more parameters of at least one of a P-wave, a Q-wave, and R-wave, an S-wave, or a T-wave, and where the representative cardiac measure is a summary statistic of the one or more parameters.

15. A medical system comprising:
a housing configured to contact a body of a patient;
an electrode supported by the housing, the electrode configured to sense a cardiac signal indicative of an electrical activity of a heart of the patient;
a temperature sensor supported by the housing, the temperature sensor configured to sense a temperature signal indicative of a body temperature of the patient;
a memory supported by the housing; and
processing circuitry supported by the housing and operably connected to the memory, wherein the processing circuitry is configured to:
define a cardiac threshold for the patient, wherein the cardiac threshold is indicative of the electrical activity of the heart when the patient is in a euglycemic range,
define a temperature threshold for the patient, wherein the temperature threshold is indicative of the body temperature when the patient is in the euglycemic range,
store the cardiac threshold and the temperature threshold using the memory,
receive the cardiac signal via the electrode and determine one or more cardiac measures using the cardiac signal, and determine a representative cardiac measure using the one or more cardiac measures;
receive the temperature signal via the temperature sensor and determine one or more temperature measures using the temperature signal, and determine a representative temperature measure using the one or more temperature measures; and
assess a glycemic state of the patient by:
retrieving the cardiac threshold and the temperature threshold from the memory,
comparing the representative cardiac measure and the cardiac threshold to determine a cardiac deviation,
comparing the representative temperature measure and the temperature threshold to determine a temperature deviation, and
generating a communication indicative of the glycemic state only when the cardiac deviation meets or exceeds a cardiac deviation limit and also the temperature deviation meets or exceeds a temperature deviation limit.

16. The medical system of claim 15, wherein the processing circuitry is configured to:
define a set of thresholding cardiac measures comprising a set of cardiac signals received over a thresholding window, and determine the cardiac threshold using the set of thresholding cardiac measures;
determine the one or more cardiac measures over a beat window; and
determine the one or more temperature measures over the beat window, wherein the thresholding window chronologically precedes the beat window.

17. The medical system of claim 15, wherein the processing circuitry is configured to:
increment a count of a tracking counter when the processing circuitry generates the communication;
generate a second communication when either the cardiac deviation fails to meet or exceed the cardiac deviation limit or the temperature deviation fails to meet or exceed the temperature deviation limit;
decrement the count of the tracking counter when the processing circuitry generates the second communication; and
issue a system alert indicative of the glycemic state of the patient when the count of the tracking counter exceeds an alert threshold.

18. A method, comprising:
defining, using processing circuitry supported by a housing, a cardiac threshold for a patient, wherein the cardiac threshold is indicative of an electrical activity of a heart of the patient when the patient is in a euglycemic range, and wherein the electrical activity of the heart of the patient is received by the processing circuitry via an electrode supported by the housing, the housing configured to contact a body of the patient, defining, using the processing circuitry, a temperature threshold for the patient using a temperature sensor configured to sense a temperature signal indicative of a body temperature of the patient, wherein the temperature threshold is indicative of the body temperature of the patient when the patient is in the euglycemic range, storing, using the processing circuitry, the cardiac threshold and the temperature threshold in a memory, receiving, by the processing circuitry, and via the electrode, a cardiac signal indicative of the electrical activity of the heart and a temperature signal indicative of a body temperature of the patient, and assessing a glycemic state of the patient by using the processing circuitry to:
  retrieve the cardiac threshold and the temperature threshold from the memory,
  determine a representative cardiac measure using the cardiac signal,
  compare the representative cardiac measure and the cardiac threshold to determine a cardiac deviation,
  determine a representative temperature measure using the temperature signal,
  compare the representative temperature measure and the temperature threshold to determine a temperature deviation, and
  generate a positive communication indicative of the glycemic state only when the cardiac deviation meets or exceeds a cardiac deviation limit and also the temperature deviation meets or exceeds a temperature deviation limit.

19. The method of claim 18, further comprising:
incrementing, using the processing circuitry, a count of a tracking counter when the processing circuitry generates the communication;
generating, using the processing circuitry, a second communication when either the cardiac deviation fails to meet or exceed the cardiac deviation limit or the temperature deviation fails to meet or exceed the temperature deviation limit;
decrementing, using the processing circuitry, the count of the tracking counter when the processing circuitry generates the second communication; and
issuing, by the processing circuitry, a system alert when the count of the tracking counter exceeds an alert threshold.

* * * * *